(12) United States Patent
Yamada et al.

(10) Patent No.: US 9,387,398 B2
(45) Date of Patent: Jul. 12, 2016

(54) VIDEO GAME WITH STATE DISPLAY OVERLAY

(75) Inventors: Yoichi Yamada, Kyoto (JP); Hidemaro Fujibayashi, Kyoto (JP); Hiromu Takemura, Kyoto (JP); Yutaka Hiramuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1256 days.

(21) Appl. No.: 12/868,889

(22) Filed: Aug. 26, 2010

(65) Prior Publication Data

US 2011/0294574 A1 Dec. 1, 2011

(30) Foreign Application Priority Data

May 26, 2010 (JP) .................. 2010-120775

(51) Int. Cl.
*A63F 9/24* (2006.01)
*A63F 13/40* (2014.01)

(52) U.S. Cl.
CPC ............ *A63F 13/10* (2013.01); *A63F 2300/609* (2013.01); *A63F 2300/632* (2013.01); *A63F 2300/6653* (2013.01)

(58) Field of Classification Search
CPC ..................................................... A63F 13/10
USPC ..................................... 463/30–32
See application file for complete search history.

(56) References Cited

U.S. PATENT DOCUMENTS

| 2001/0029202 | A1* | 10/2001 | Kondo et al. ................... 463/31 |
| 2002/0142834 | A1* | 10/2002 | Sobue ............................. 463/30 |
| 2004/0157662 | A1* | 8/2004 | Tsuchiya ........................ 463/32 |
| 2005/0171754 | A1* | 8/2005 | Santodomingo et al. ....... 703/21 |
| 2006/0287027 | A1* | 12/2006 | Hardisty et al. ................. 463/8 |
| 2010/0248825 | A1* | 9/2010 | Toyoda ........................... 463/30 |

FOREIGN PATENT DOCUMENTS

| JP | 2005-103154 | 4/2005 |
| JP | 2009-279038 | 12/2009 |

OTHER PUBLICATIONS

Metroid Prime 2 Dark Echoes, Mainichi Communications Inc., Jul. 10, 2005, First Edition, pp. 4-11 (partial translation).

\* cited by examiner

*Primary Examiner* — Steve Rowland
(74) *Attorney, Agent, or Firm* — Nixon & Vanderhye, P.C.

(57) ABSTRACT

A first area and a second area are set in a virtual space. Then, based on first configuration information for configuring a first state of a game world, a first object to be placed in the first area is generated. In addition, a second object to be placed in the second area is generated based on second configuration information for configuring a second state different from the first state at a predetermined position in the virtual space to which the first configuration information is applied.

20 Claims, 23 Drawing Sheets

| OBJECT NUMBER | CURRENT POSITION | TYPE DATA |
|---|---|---|
| 001 | (xx,yy,zz) | FIELD |
| 002 | (xx,yy,zz) | NONACTIVE |
| 003 | (xx,yy,zz) | ACTIVE |
| 004 | (xx,yy,zz) | TERRAIN |
| ⋮ | ⋮ | ⋮ |

| OBJECT NUMBER | APPEARANCE DATA | BEHAVIOR DATA | OTHER DATA |
|---|---|---|---|
| 001 | QUICKSAND | SINK | ... |
| 002 | STARVED TREE | NOTHING | ... |
| 003 | CHICKEN | MOVE AROUND | ... |
| 004 | CLIFF | NOTHING | ... |
| ⋮ | ⋮ | ⋮ | ⋮ |

| OBJECT NUMBER | APPEARANCE DATA | BEHAVIOR DATA | OTHER DATA |
|---|---|---|---|
| 001 | GRASS | NOTHING | ... |
| 002 | LUSH TREE | NOTHING | ... |
| 003 | MONSTER | RUSH | ... |
| 004 | CLIFF | NOTHING | ... |
| ⋮ | ⋮ | ⋮ | ⋮ |

211  221  TERRAIN OBJECT

FIG. 32

| OBJECT NUMBER (501) | TERRAIN CODE (502) |
|---|---|
| 0050 | 0001 |
| 0051 | 0001 |
| 0052 | 0003 |
| 0053 | 0007 |
| 0054 | 0003 |
| ⋮ | ⋮ |

FIG. 33

| OBJECT NUMBER (511) | TERRAIN CODE (512) | APPEARANCE DATA (513) | BEHAVIOR DATA (514) |
|---|---|---|---|
| 0100 | 0001 | ... | ... |
|  | 0002 | ... | ... |
|  | 0003 | ... | ... |
|  | 0004 | ... | ... |
| 0101 | 0001 | ... | ... |
|  | 0003 | ... | ... |
|  | 0006 | ... | ... |
|  | 0007 | ... | ... |
| 0102 | 0002 | ... | ... |
|  | 0004 | ... | ... |
|  | 0007 | ... | ... |
|  | 0008 | ... | ... |
| ⋮ | ⋮ | ⋮ | ⋮ |

VIDEO GAME WITH STATE DISPLAY OVERLAY

CROSS REFERENCE TO RELATED APPLICATION

The disclosure of Japanese Patent Application No. 2010-120775, filed on May 26, 2010, is incorporated herein by reference.

BACKGROUND OF THE INVENTION

1. Field of the Invention

The present invention relates to a computer-readable storage medium having stored therein a game program of operating a player object in a virtual space, and more specifically, to control of processing configuring a game world in the virtual space.

2. Description of the Background Art

Conventionally, a game apparatus that progresses a game by a player operating a character in a virtual three-dimensional space is known (for example, Japanese Laid-Open Patent Publication No. 2009-279038). In this game apparatus, the player operates a character while viewing a virtual three-dimensional space displayed on a screen.

However, in the game apparatus, the player can easily predict how a character behaves in a range displayed on the screen. For example, in the displayed range, the player can easily grasp an area that the character can enter, and an area that the character cannot enter. In this respect, the inventor has found room for enhancing amusingness of a game.

SUMMARY OF THE INVENTION

Therefore, an object of the present invention is to provide a computer-readable storage medium having stored therein a game program, a game system, a game apparatus, and a game control method, the game program being capable of enhancing unexpectedness of development of a game, and further, enhancing amusingness of a game.

The present invention has the following features to attain the object mentioned above.

A first aspect is a computer-readable storage medium having stored therein a game program which is executed by a computer of a game apparatus executing a game of operating a player object in a game world created in a virtual space, the game program causing the computer to function as: first area setting means; second area setting means; first object generation means; and second object generation means. The first area setting means sets a first area in the virtual space. The second area setting means sets a second area in the virtual space. The first object generation means generates a first object to be placed in the first area set by the first area setting means, based on first configuration information for configuring a first state in at least a part of the game world. The second object generation means generates a second object to be placed in the second area set by the second area setting means, based on second configuration information for configuring a second state different from the first state at a predetermined position in the virtual space to which the first configuration information is applied.

According to the first aspect, an object is generated by using configuration information that differs depending on whether an area set at a predetermined position in the virtual space is the first area or the second area. Therefore, a state of the game world that differs depending on a condition even at the same position is generated, thereby providing unexpected development of a game.

In a second aspect based on the first aspect, the game program further causes the computer to function as first area variation means for dynamically varying the first area in accordance with an operation of an operation device performed by a player.

According to the second aspect, a position or the size of the first area can be varied in accordance with an operation of the player, thereby enhancing amusingness of a game.

In a third aspect based on the second aspect, the first area variation means dynamically varies a position of the first area in the virtual space in accordance with the operation of the operation device performed by the player.

In a fourth aspect based on the first aspect, the game program further causes the computer to function as reference position determination means for determining a reference position of the first area in accordance with an operation of an operation device performed by a player, and the first area setting means sets the first area based on the reference position.

According to the fourth aspect, the first area can be set at a position that the player desires, thereby enhancing amusingness of a game.

In a fifth aspect based on the first aspect, each of the first object and the second object is a field/terrain object for forming a field or terrain of the game world, and the game program further causes the computer to function as game world generation means for based on the field/terrain object generated by the first object generation means and the field/terrain object generated by the second object generation means, generating a field or terrain of the game world on which a player object or a non-player object other than the terrain object can be placed.

According to the fifth aspect, a field and terrain including terrain in the first state of the game world and terrain in the second state of the game world in a combined manner can be generated. Thus, a field and terrain on which the player object acts differ depending on setting of an area even at the same position, thereby providing unexpected development of a game.

In a sixth aspect based on the fifth aspect, identification information is set for each of the first object and the second object, and the game program further causes the computer to function as determination means for obtaining a piece of the identification information corresponding to the first object or the second object on which the player object or the non-player object is placed, and determining a behavior or a state of the player object or the non-player object, based on the obtained piece of the identification information.

According to the sixth aspect, identification information for determining a behavior or a state of an object in accordance with a field or terrain at which the object is positioned, is set. Therefore, the behavior or a state of the object can be changed easily and variously.

In a seventh aspect based on the fifth aspect, the game program further causes the computer to function as player object action control means for controlling an action of the player object placed on the field or the terrain of the game world, in accordance with an operation of an operation device performed by a player.

According to the seventh aspect, the player object can be operated on a field and terrain including terrain in the first state of the game world and terrain in the second state of the game world in a combined manner.

In an eighth aspect based on the fifth aspect, an attribute is set for the non-player object, the attribute differing depending on whether the non-player object is placed in the first area or in the second area.

According to the eighth aspect, an attribute of an object can be changed in accordance with a state (the first state or the second state) of the game world in an area, thereby enhancing amusingness of a game.

In a ninth aspect based on the first aspect, the game program further causes the computer to function as: two-dimensional map generation means for generating a two-dimensional map representing the game world, based on the first configuration information; and two-dimensional map display means for displaying the generated two-dimensional map.

According to the ninth aspect, the player can progress a game in the game world in the second state while referring to a two-dimensional map showing the first state of the game world. Thus, a hint for, for example, where the player should set the first area can be given to the player, thereby enhancing amusingness of a game.

In a tenth aspect based on the first aspect, upon start of execution of the game, the game is started in a state in which the second area is set in the gameworld, and the first area setting means starts, in accordance with an operation of an operation device performed by a player, setting at least a part of the set second area as the first area.

According to the tenth aspect, setting of the first area can be started at a timing that the player desires, thereby enhancing amusingness of a game.

In an eleventh aspect based on the first aspect, the first area setting means starts setting the first area when a setting starting object for starting setting the first area is placed at a predetermined place in the game world.

In a twelfth aspect based on the eleventh aspect, the first area setting means sets a position of the first area, based on a position of the setting starting object.

In a thirteenth aspect based on the eleventh aspect, the setting starting object can be moved via the player object whose action is controlled in accordance with an operation of an operation device performed by a player.

In a fourteenth aspect based on the eleventh aspect, the first area setting means starts setting the first area when the player object performs a predetermined action for the setting starting object.

The eleventh to fourteenth aspects enhance amusingness of a game.

In a fifteenth aspect based on the first aspect, the game program further causes the computer to function as area releasing means for cancelling the setting of the first area when a predetermined time has elapsed after the first area is set by the first area setting means.

According to the fifteenth aspect, a time limit during which the first area appears can be set, thereby enhancing amusingness of a game.

In a sixteenth aspect based on the first aspect, the game program further causes the computer to function as game screen display means for, when the first area is set by the first area setting means, generating and displaying a game screen that includes at least a part of a boundary between the first area and the second area.

According to the sixth aspect, two different world states are displayed on one game screen. Therefore, the player can progress a game while viewing the two world state, thereby enhancing unexpectedness of development of a game and enhancing amusingness of the game.

In a seventeenth aspect based on the first aspect, the game program further causes the computer to function as: position obtaining means; and area determination means for determining whether the position obtained by the position obtaining means is in the first area or in the second area. The position obtaining means obtains a position in the virtual space of an object present in either one of the first area and the second area. The area determination means determines whether the position obtained by the position obtaining means is in the first area or in the second area. The first object generation means generates the first object, based on the first configuration information, when the area determination means has determined that the obtained position is in the first area. The second object generation means generates the second object, based on the second configuration information, when the area determination means has determined that the obtained position is in the second area.

According to the seventeenth aspect, an object is generated by using configuration information that differs depending on whether an area set at a predetermined position in the virtual space is the first area or the second area. Therefore, an object to be controlled differently depending on a condition even at the same position is generated, thereby providing unexpected development of a game.

An eighteenth aspect is a game system for executing a game of operating a player object in a game world created in a virtual space, the game system comprising: first area setting means; second area setting means; first object generation means; and second object generation means. The first area setting means sets a first area in the virtual space. The second area setting means sets a second area in the virtual space. The first object generation means generates a first object to be placed in the first area set by the first area setting means, based on first configuration information for configuring a first state in at least a part of the game world. The second object generation means generates a second object to be placed in the second area set by the second area setting means, based on second configuration information for configuring a second state different from the first state at a predetermined position in the virtual space to which the first configuration information is applied.

A nineteenth aspect is a game apparatus for executing a game of operating a player object in a game world created in a virtual space, the game apparatus comprising: first area setting means; second area setting means; first object generation means; and second object generation means. The first area setting means sets a first area in the virtual space. The second area setting means sets a second area in the virtual space. The first object generation means generates a first object to be placed in the first area set by the first area setting means, based on first configuration information for configuring a first state in at least a part of the game world. The second object generation means generates a second object to be placed in the second area set by the second area setting means, based on second configuration information for configuring a second state different from the first state at a predetermined position in the virtual space to which the first configuration information is applied.

A twentieth aspect is a game control method performed by a game apparatus for executing a game of operating a player object in a game world created in a virtual space, the game control method comprising: a first area setting step; a second area setting step; a first object generation step; and a second object generation step. The first area setting step sets a first area in the virtual space. The second area setting step sets a second area in the virtual space. The first object generation step generates a first object to be placed in the first area set in the first area setting step, based on first configuration information for configuring a first state in at least a part of the game world. The second object generation step generates a second object to be placed in the second area set in the second area setting step, based on second configuration information for configuring a second state different from the first state at a predetermined position in the virtual space to which the first configuration information is applied.

According to the eighteenth to twentieth aspects, the same effect as in the first aspect can be obtained.

The present invention can enhance unexpectedness of development of a game, and further, enhance amusingness of a game.

These and other objects, features, aspects and advantages of the present invention will become more apparent from the following detailed description of the present invention when taken in conjunction with the accompanying drawings.

BRIEF DESCRIPTION OF THE DRAWINGS

FIG. 21 is a diagram showing an example of a data configuration of first area data 126a;

FIG. 22 is a diagram showing an example of a data configuration of object identification data 141;

FIG. 23 is a diagram showing an example of a data configuration of a present object master 143;

FIG. 24 is a diagram showing an example of a data configuration of a past object master 145;

FIG. 32 is an example of a table used when processing based on a "terrain code" is performed; and FIG. 33 is another example of a table used when processing based on a "terrain code" is performed.

DESCRIPTION OF THE PREFERRED EMBODIMENTS

The following will describe an embodiment of the present invention with reference to the drawings. It is noted that the present invention is not limited by the embodiment.

[Whole Configuration of Game System]

Figure 1:
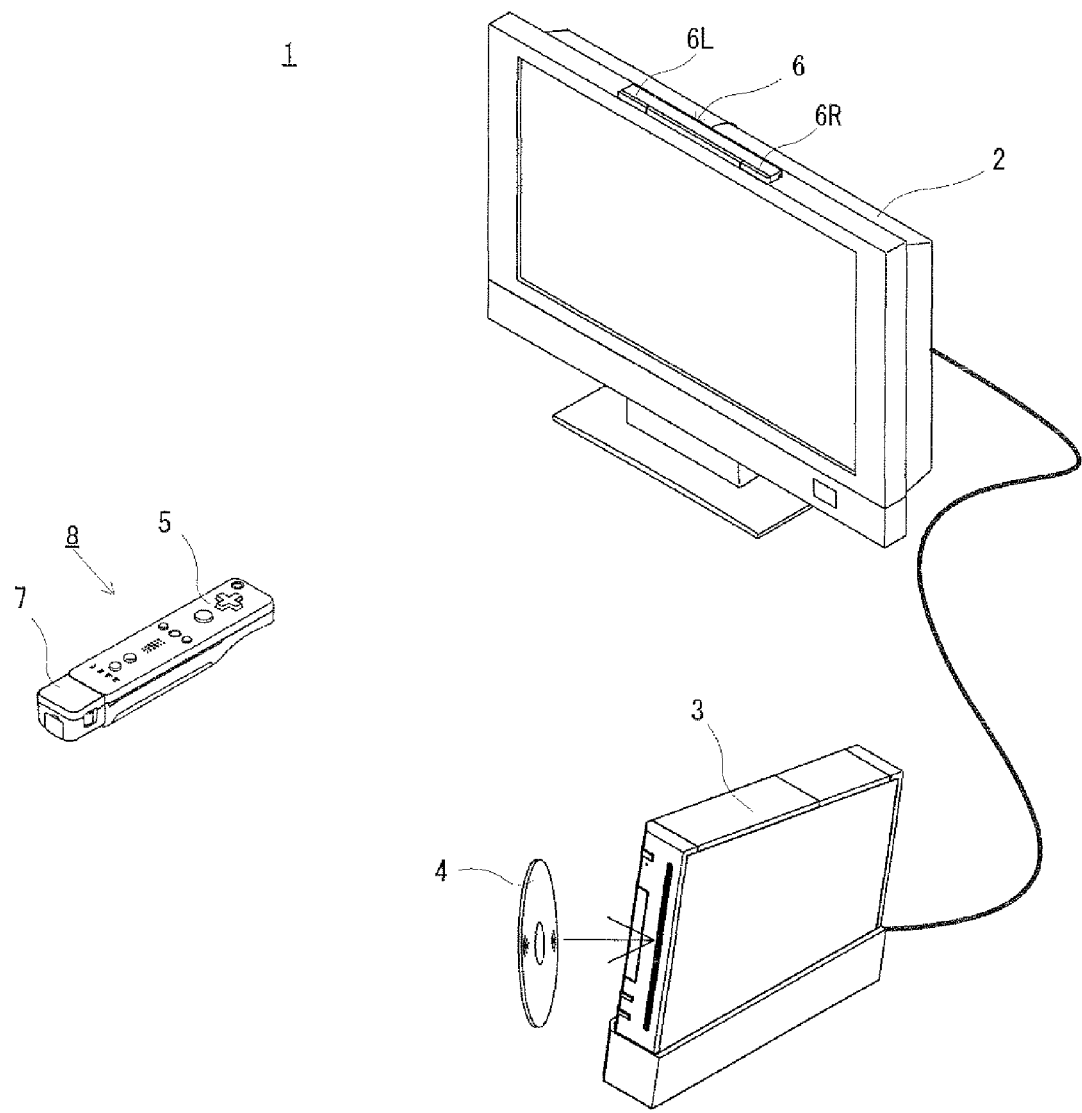
FIG. 1 is an external view of a game system 1.

Referring to FIG. 1, a game system 1 including an example of a game apparatus according to the embodiment of the present invention will be described. FIG. 1 is an external view of the game system 1. Hereinafter, the game apparatus and a game program of the present embodiment will be described referring to a stationary game apparatus as an example. As shown in FIG. 1, the game system 1 includes a television receiver (hereinafter, referred to merely as a television) 2, a game apparatus 3, an optical disc 4, an input apparatus 8, and a marker section 6. The game system 1 executes game processing on the game apparatus 3 in accordance with a game operation performed by using the input apparatus 8.

The optical disc 4, which is an example of an information storage medium replaceably used with respect to the game apparatus 3, is detachably inserted in the game apparatus 3. The optical disc 4 stores a game program which is to be executed by the game apparatus 3. The game apparatus 3 has an insertion slot for the optical disc 4 at the front surface of the game apparatus 3. The game apparatus 3 reads and executes the game program stored in the optical disc 4 inserted in the insertion slot, thereby executing the game processing.

The television 2, which is an example of a display device, is connected to the game apparatus 3 via a connection cord. The television 2 displays game images which are obtained as the result of the game processing executed by the game apparatus 3. In addition, the marker section 6 is mounted in the vicinity of the screen of the television 2 (in FIG. 1, on the upper surface of the screen). The marker section 6 has a marker 6R and a marker 6L at the respective ends of the marker section 6. Specifically, the marker 6R (as well as the marker 6L) has one or more infrared LEDs which output infrared light forward from the television 2. The marker section 6 is connected to the game apparatus 3, and the game apparatus 3 is capable of controlling illumination of each infrared LED of the marker section 6.

The input apparatus 8 provides the game apparatus 3 with operation data which indicates contents of an operation made to the input apparatus 8. In the present embodiment, the input apparatus 8 includes a controller 5 and a gyro sensor unit 7. Though described in detail later, the input apparatus 8 is configured such that the gyro sensor unit 7 is connected to the controller 5 in a detachable manner. The controller 5 is connected to the game apparatus 3 by wireless communication.

In the present embodiment, the technology of, for example, Bluetooth (registered trademark) is used for the wireless communication between the controller 5 and the game apparatus 3. It is noted that in an alternative embodiment, the controller 5 may be connected to the game apparatus 3 via a wire.

[Internal Configuration of Game Apparatus 3]

Figure 2:
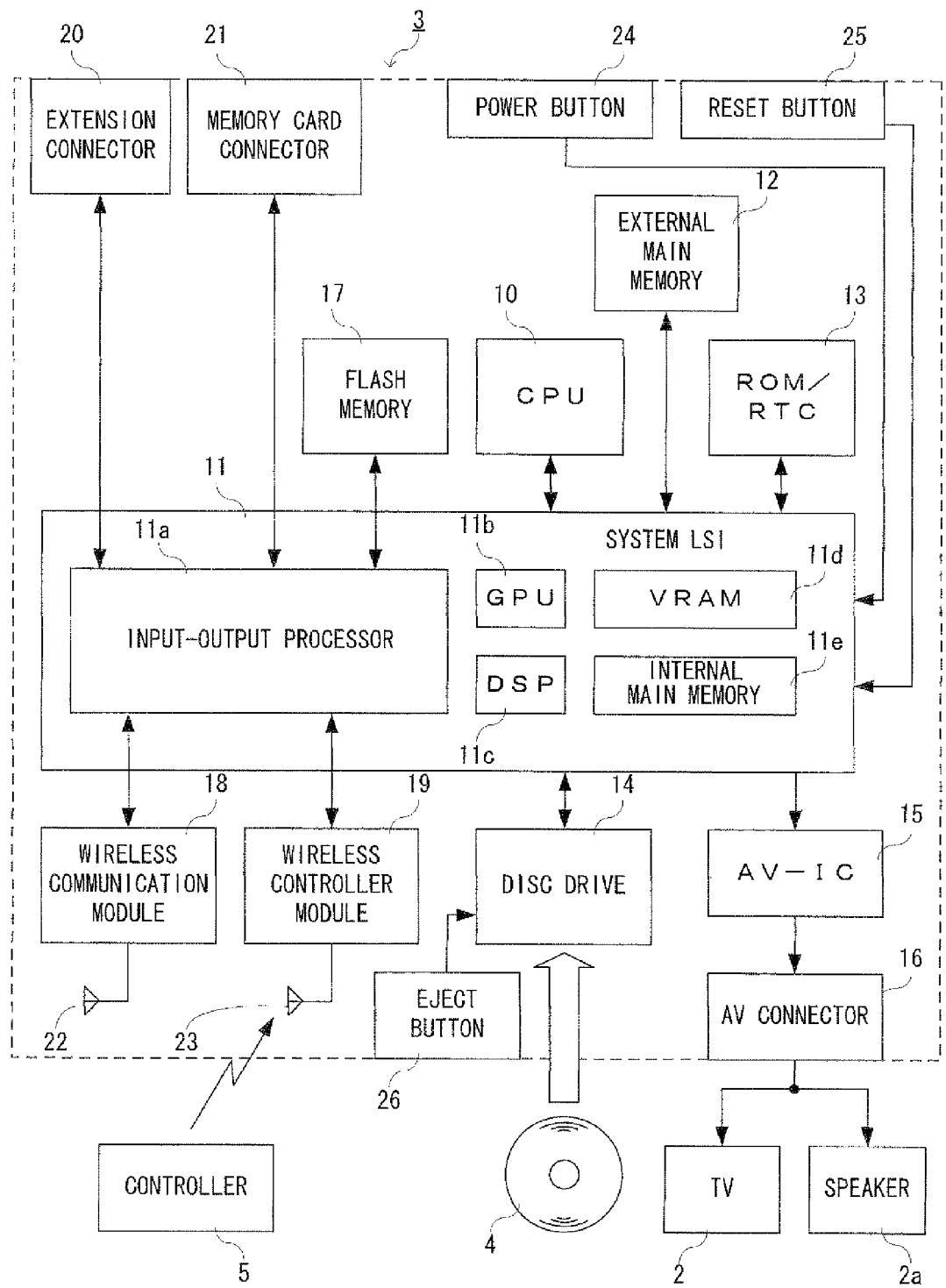
FIG. 2 is a block diagram showing a configuration of a game apparatus 3.

The following will describe an internal configuration of the game apparatus 3 with reference to FIG. 2. FIG. 2 is a block diagram showing a configuration of the game apparatus 3. The game apparatus 3 includes a CPU 10, a system LSI 11, an external main memory 12, a ROM/RTC 13, a disc drive 14, an AV-IC 15, and the like.

The CPU 10 executes the game processing by executing the game program stored in the optical disc 4, and functions as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processing such as control of data transfer between the system LSI 11 and each component connected to the system LSI 11, generation of an image to be displayed, obtaining data from an external device, and the like. An internal configuration of the system LSI 11 will be described later. The volatile external main memory 12 stores a program such as the game program read from the optical disc 4, a game program read from a flash memory 17, and the like, and stores various data. The external main memory 12 is used as a work area and a buffer area for the CPU 10. The ROM/RTC 13 includes a ROM (so-called boot ROM) that stores a program for starting up the game apparatus 3, and a clock circuit (RTC: Real Time Clock) for counting time. The disc drive 14 reads program data, texture data, and the like from the optical disc 4, and writes the read data into an internal main memory 11*e* described later, or the external main memory 12.

In addition, the system LSI 11 is provided with an input-output processor (I/O processor) 11*a*, a GPU (Graphics Processor Unit) 11*b*, a DSP (Digital Signal Processor) 11*c*, a VRAM 11*d*, and the internal main memory 11*e*. Although not shown in the drawings, these components 11*a* to 11*e* are connected to each other via an internal bus.

The GPU 11*b* forms a part of drawing means, and generates an image in accordance with a graphics command (command for generating graphics) from the CPU 10. The VRAM 11*d* stores data, such as polygon data and texture data, which are required for the GPU 11*b* to execute the graphics command. Upon generation of an image, the GPU 11*d* creates the image data by using the data stored in the VRAM 11*d*.

The DSP 11*c* functions as an audio processor, and generates audio data by using sound data and sound waveform (tone color) data which are stored in the internal main memory 11*e* or the external main memory 12.

The image data and the audio data generated as described above are read by the AV-IC 15. The AV-IC 15 outputs the read image data to the television 2 via an AV connector 16, and the read audio data to speakers 2*a* built in the television 2. Thus, an image is displayed on the television 2, and sound is outputted from the speakers 2*a*.

The input-output processor 11*a* performs transmission and reception of data to and from each component connected to the input-output processor 11*a*, and downloads data from an external device. The input-output processor 11*a* is connected to the flash memory 17, a wireless communication module 18, a wireless controller module 19, an extension connector 20, and a memory card connector 21. An antenna 22 is connected to the wireless communication module 18, and an antenna 23 is connected to the wireless controller module 19.

The input-output processor 11*a* is connected to a network via the wireless communication module 18 and the antenna 22, so that the input-output processor 11*a* is communicable with another game apparatus connected to the network and various servers connected to the network. The input-output processor 11*a* periodically accesses the flash memory 17 to detect whether there are data needed to be transmitted to the network. If there is such data, the input-output processor 11*a* transmits the data to the network via the wireless communication module 18 and the antenna 22. In addition, the input-output processor 11*a* receives data transmitted from the other game apparatus and data downloaded from a download server via the network, the antenna 22, and the wireless communication module 18, and then stores the received data in the flash memory 17. The CPU 10 reads the data stored in the flash memory 17 by executing the game program, and uses the data for the game program. In addition to the data transmitted or received between the game apparatus 3 and the other game apparatus or various servers, the flash memory 17 may store saved data (result data or midstream data of the game) of the game played by using the game apparatus 3.

In addition, the input-output processor 11*a* receives operation data transmitted from the controller 5, via the antenna 23 and the wireless controller module 19, and stores (temporarily stores) the operation data in the buffer area of the internal main memory 11*e* or the external main memory 12.

In addition, the extension connector 20 and the memory card connector 21 are connected to the input-output processor 11*a*. The extension connector 20 is a connector for an interface such as USB and SCSI. Instead of using the wireless communication module 18, the extension connector 20 enables the communication with the network by connecting, to the extension connector 20, a medium such as an external storage medium, a peripheral device such as another controller, or a wired connector for communication. The memory card connector 21 is a connector for connecting thereto an external storage medium such as a memory card. For example, the input-output processor 11*a* accesses the external storage medium via the extension connector 20 or the memory card connector 21, thereby saving data in the external storage medium and reading data from the external storage medium.

The game apparatus 3 is provided with a power button 24, a reset button 25, and an eject button 26. The power button 24 and the reset button 25 are connected to the system LSI 11. When the power button 24 is turned on, electric power is supplied to each component of the game apparatus 3 via an AC adaptor (not shown). The reset button 25 is pressed to cause the system LSI 11 to restart a startup program of the game apparatus 3. The eject button 26 is connected to the disc drive 14. The eject button 26 is pressed to eject the optical disc 4 from the disc drive 14.

[Configuration of Input Apparatus 8]

Figure 3:
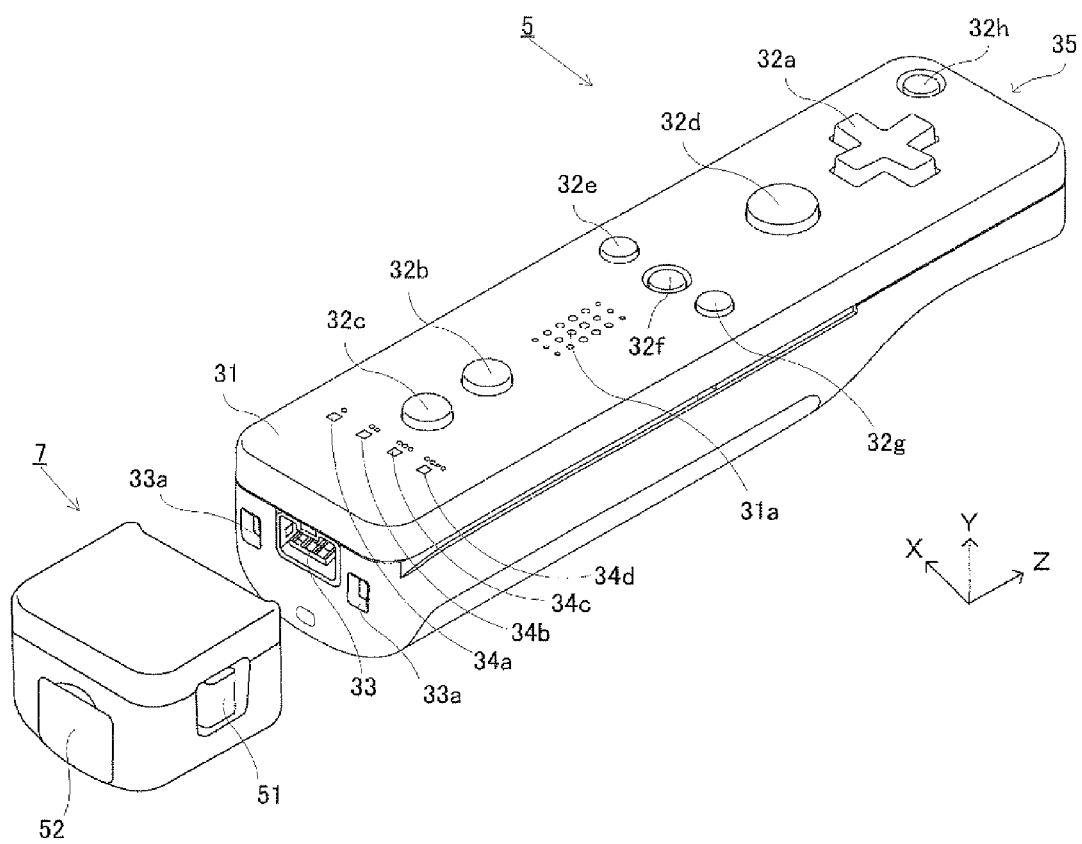
FIG. 3 is a perspective view showing an external configuration of an input apparatus 8.
Figure 4:
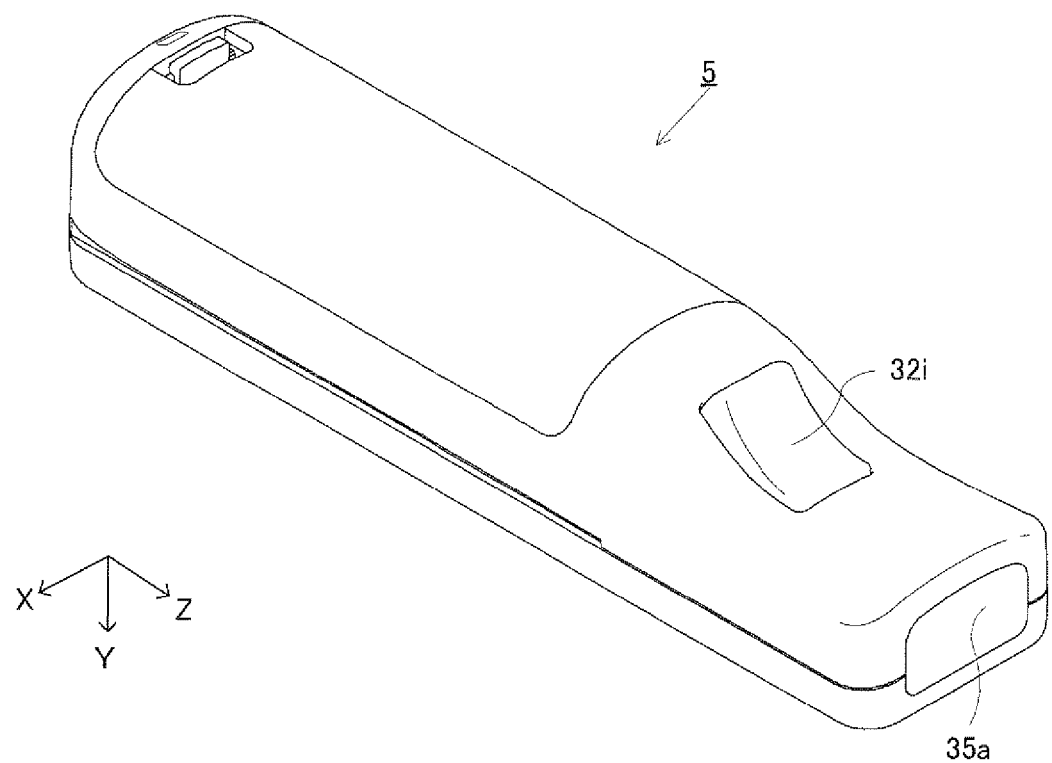
FIG. 4 is a perspective view showing an external configuration of a controller 5.

Next, the input apparatus 8 will be described with reference to FIGS. 3 to 6. FIG. 3 is a perspective diagram showing an external configuration of the input apparatus 8. FIG. 4 is a perspective diagram showing an external configuration of the controller 5. The perspective view of FIG. 3 is seen from a top rear side of the controller 5, and the perspective view of FIG. 4 is seen from a bottom front side of the controller 5.

As shown in FIG. 3 and FIG. 4, the controller 5 has a housing 31 formed by, for example, plastic molding. The housing 31 has a generally parallelepiped shape extending in a longitudinal direction (Z-axis direction shown in FIG. 3) from front to rear. The overall size of the housing 31 is small enough to be held by one hand of an adult or even a child. The player can perform a game operation by pressing a button provided to the controller 5 or moving the controller 5 to change the position or the attitude thereof.

A plurality of operation buttons are provided to the housing 31. As shown in FIG. 3, there are provided, on the top surface of the housing 31, a cross button 32a, a first button 32b, a second button 32c, an A-button 32d, a minus button 32e, a home button 32f, a plus button 32g, and a power button 32h. In the present specification, the top surface of the housing 31 on which the above buttons 32a to 32h are provided is sometimes referred to as a "button surface". On the other hand, as shown in FIG. 4, a recessed portion is formed on a bottom surface of the housing 31, and a B-button 32i is provided on a slope surface at the rear of the recessed portion. Operation functions are appropriately assigned to the operation buttons 32a to 32i in accordance with the game program executed by the game apparatus 3. In addition, the power button 32h is used for turning on or off the power of the game apparatus 3 by remote control. The home button 32f and the power button 32h have top surfaces thereof buried in the top surface of the housing 31. Thus, the player can be prevented from erroneously pressing the home button 32f or the power button 32h.

On a rear surface of the housing 31, a connector 33 is provided. The connector 33 is used for connecting another apparatus (for example, the gyro sensor unit 7 or another controller) to the controller 5. In addition, latch dents 33a are provided on the both sides of the connector 33 on the rear surface of the housing 31. The latch dents 33a prevent the other apparatus from being easily detached.

On the rear portion of the top surface of the housing 31, a plurality of (four, in FIG. 3) LEDs 34a to 34d are provided. Here, a controller type (number) is assigned to the controller 5 such that the controller 5 is distinguishable from another main controller. The LEDs 34a to 34d are used for, for example, informing the player of the controller type which is currently set for the controller 5, or for informing the player of remaining battery charge of the controller 5. More specifically, when a game operation is performed by using the controller 5, one of the plurality of LEDs 34a to 34d is lit up in accordance with the controller type.

The controller 5 has an imaging information calculation section 35 (FIG. 6), and a light incident surface 35a of the imaging information calculation section 35 is provided on the front surface of the housing 31, as shown in FIG. 4. The light incident surface 35a is made of material allowing at least infrared light outputted from the markers 6R and 6L to pass through.

On the top surface of the housing 31, a sound hole 31a for externally outputting a sound from a speaker 49 (shown in FIG. 5) which is incorporated in the controller 5 is provided between the first button 32b and the home button 32f.

Figure 5:
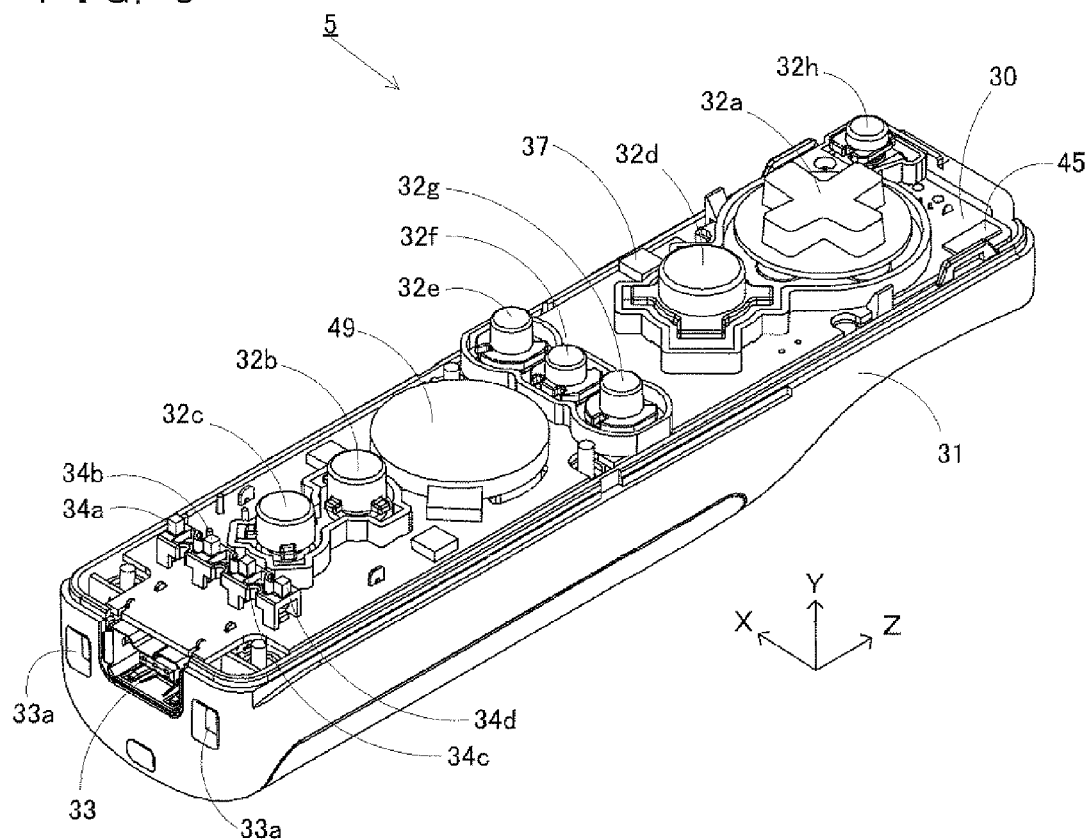
FIG. 5 is a view showing an internal configuration of the controller 5.
Figure 6:
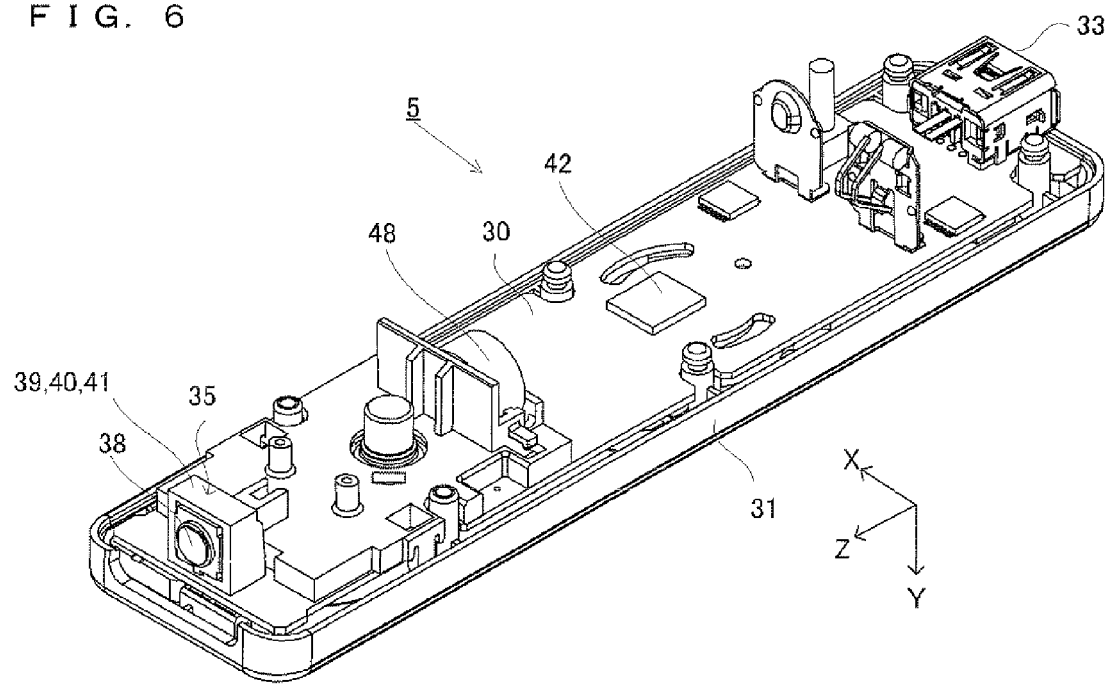
FIG. 6 is a view showing an internal configuration of the controller 5.

Next, with reference to FIGS. 5 and 6, an internal structure of the controller 5 will be described. FIG. 5 and FIG. 6 are diagrams illustrating the internal structure of the controller 5. FIG. 5 is a perspective view illustrating a state where an upper housing (a part of the housing 31) of the controller 5 is removed. FIG. 6 is a perspective view illustrating a state where a lower housing (a part of the housing 31) of the controller 5 is removed. FIG. 6 is a perspective view illustrating a reverse side of a substrate 30 shown in FIG. 5.

As shown in FIG. 5, the substrate 30 is fixed inside the housing 31, and on a top main surface of the substrate 30, the operation buttons 32a to 32h, the LEDs 34a to 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated around the Z-axis may be facilitated. Further, the acceleration sensor 37 is provided in front of the center of the controller 5 with respect to the longitudinal direction (Z-axis direction). Further, a wireless module 44 (see FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, the image pickup element 40 and an image processing circuit 41 located in order, respectively, from the front surface of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by an actuation of the vibrator 48 based on a command from the microcomputer 42. Therefore, the vibration is conveyed to the player's hand holding the controller 5, and thus a so-called vibration-responsive game is realized. In the present embodiment, the vibrator 48 is disposed slightly toward the front of the housing 31. That is, the vibrator 48 is positioned at the end portion of the controller 5 offset from the center thereof, and therefore the vibration of the vibrator 48 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

Further, the gyro sensor unit 7 includes a gyro sensor (gyro sensors 55 and 56 shown in FIG. 7) for detecting for angular velocities around three axes, respectively. The gyro sensor unit 7 is detachably mounted to the connector 33 of the controller 5. The gyro sensor unit 7 has, at the front edge (an edge portion facing toward the Z-axis positive direction shown in FIG. 3), a plug (a plug 53 shown in FIG. 7) connectable to the connector 33. Further, the plug 53 has hooks (not shown) on both sides, respectively. In a state where the gyro sensor unit 7 is mounted to the controller 5, the plug 53 is connected to the connector 33, and the hooks engage in the locking holes 33a, respectively, of the controller 5. Therefore, the controller 5 and the gyro sensor unit 7 are securely fixed to each other. Further, the gyro sensor unit 7 has a button 51 on each side surface (surfaces facing toward the X-axis direction shown in FIG. 3). When the buttons 51 are pressed, the hooks are disengaged from the locking holes 33a. Therefore, when the plug 53 is removed from the connector 33 while the buttons 51 are being pressed, the gyro sensor unit 7 can be disconnected from the controller 5.

Further, a connector having the same shape as the connector 33 is provided at the rear edge of the gyro sensor unit 7. Therefore, another device which can be mounted to (the connector 33 of) the controller 5 can be mounted to the connector of the gyro sensor unit 7. In FIG. 3, a cover 52 is detachably provided over the connector.

The shapes of the controller 5 and the gyro sensor unit 7, a shape of each operation button, the number of acceleration sensors, the number of vibrators, fixing positions of the acceleration sensor and the vibrator, and the like shown in FIGS. 3 to 6 are merely examples. The present invention can be realized by using other shapes, numbers, and fixing positions. Further, although in the present embodiment the imaging direction of the image pickup means is Z-axis positive direction, the imaging direction may be any direction. That is, the imagining information calculation section 35 (the light incident surface 35a of the imaging information calculation section 35) of the controller 5 may not be provided on the front surface of the housing 31, but may be provided on any other surface on which a light can be received from the outside of the housing 31.

Figure 7:
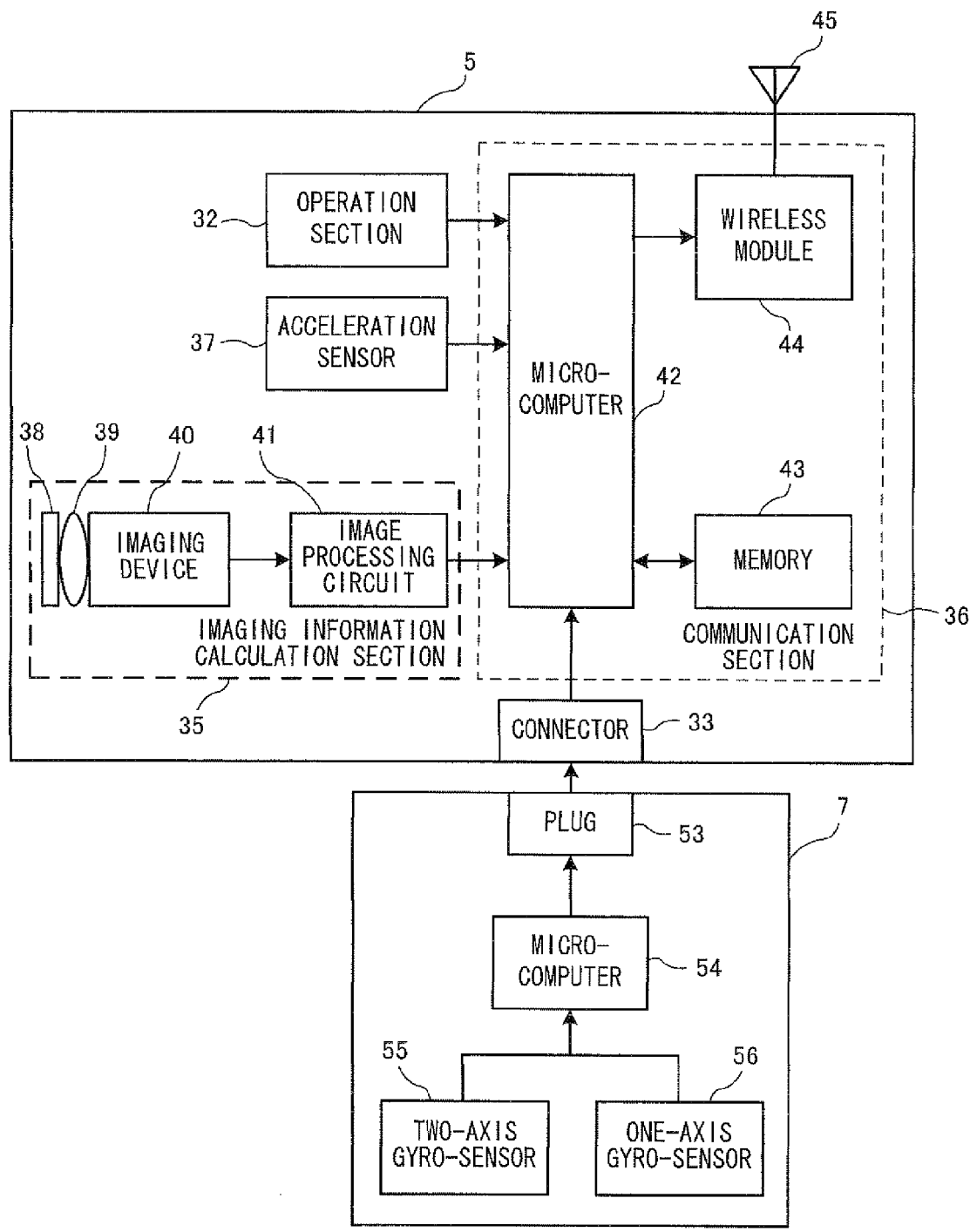
FIG. 7 is a block diagram showing a configuration of the input apparatus 8.

FIG. 7 is a block diagram illustrating a structure of the input device 8 (the controller 5 and the gyro sensor unit 7). The controller 5 includes an operation section 32 (the respective operation buttons 32a to 32i), the connector 33, the imaging information calculation section 35, a communication section 36, and the acceleration sensor 37. The controller 5 transmits, as operation data, data representing a content of operation performed on the controller 5 itself, to the game apparatus 3.

The operation section 32 includes the operation buttons 32a to 32i described above, and outputs, to the microcomputer 42 of a communication section 36, operation button data indicating an input state (that is, whether or not each operation button 32a to 32i is pressed) of each operation button 32a to 32i.

The imaging information calculation section 35 is a system for analyzing image data taken by the image pickup means and calculating the centroid, the size and the like of an area having a high brightness in the image data. The imaging information calculation section 35 has, for example, a maximum sampling period of about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 allows only infrared light to pass therethrough, among light incident on the front surface of the controller 5. The lens 39 collects the infrared light which has passed through the infrared filter 38 so as to be incident on the image pickup element 40. The image pickup element 40 is a solid-state imaging device such as, for example, a CMOS sensor or a CCD sensor, and receives the infrared light collected by the lens 39, and outputs an image signal. The markers 6R and 6L of the marker section 6 provided near the display screen of the television 2 each includes an infrared LED for outputting infrared light forward from the television 2. Therefore, the infrared filter 38 enables the image pickup element 40 to receive only the infrared light which has passed through the infrared filter 38 and generate image data, so that an image of each of the markers 6R and 6L can be captured with enhanced accuracy. Hereinafter, the image captured by the image pickup element 40 is referred to as a pickup image. The image data generated by the image pickup element 40 is processed by the image processing circuit 41. The image processing circuit 41 calculates, in the pickup image, a position of an imaging subject (the marker 6R and the marker 6L). The image processing circuit 41 outputs data representing a coordinate point of the calculated position, to the microcomputer 42 of the communication section 36. The data representing the coordinate point is transmitted as operation data to the game apparatus 3 by the microcomputer 42. Hereinafter, the coordinate point is referred to as a "marker coordinate point". The marker coordinate point changes depending on an orientation (angle of tilt) and/or a position of the controller 5 itself, and therefore the game apparatus 3 is allowed to calculate the orientation and the position of the controller 5 by using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects for an acceleration (including gravitational acceleration) of the controller 5, that is, detects for a force (including gravity) applied to the controller 5. The acceleration sensor 37 detects a value of an acceleration (linear acceleration) in the straight line direction along the sensing axis direction, among accelerations applied to a detection section of the acceleration sensor 37. For example, multiaxial acceleration sensor having two or more axes detects an acceleration of a component for each axis, as an acceleration applied to the detection section of the acceleration sensor. For example, three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects a linear acceleration in three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration for the straight line direction along each axis, and an output from the acceleration sensor 37 represents a value of the linear acceleration for each of the three axes. In other words, the detected acceleration is represented as a three-dimensional vector (ax, ay, az) in an XYZ-coordinate system (controller coordinate system) defined relative to the input device 8 (controller 5). Hereinafter, a vector representing components of the acceleration values detected for the three axes, respectively, by the acceleration sensor 37 is referred to as an acceleration vector.

Data (acceleration data) representing an acceleration detected by the acceleration sensor 37 is outputted to the communication section 36. The acceleration detected by the acceleration sensor 37 changes depending on an orientation (angle of tilt) and a movement of the controller 5, and therefore the game apparatus 3 is allowed to calculate the orientation and the movement of the controller 5 by using the acceleration data. In the present embodiment, the game apparatus 3 determines the orientation of the controller 5 based on the acceleration data.

The data (acceleration data) representing the acceleration (acceleration vector) detected by the acceleration sensor 37 is outputted to the communication section 36. In the present embodiment, the acceleration sensor 37 is used as a sensor for outputting data to be used for determining the angle of tilt of the controller 5.

When a computer such as a processor (for example, the CPU 10) of the game apparatus 3 or a processor (for example, the microcomputer 42) of the controller 5 processes an acceleration signal outputted from the acceleration sensor 37, additional information relating to the controller 5 can be inferred or calculated (determined), as one skilled in the art will readily understand from the description herein. For example, suppose a case where the computer performs a process, based on the precondition that the controller 5 including the accelerate sensor 37 is in a static state (that is, a case where a process is performed based on the precondition that an acceleration detected by the acceleration sensor will include only a gravitational acceleration). When the controller 5 is actually in the static state, it is possible to determine whether or not the controller 5 tilts relative to the direction of gravity and to also determine a degree of the tilt, based on the acceleration having been detected. Specifically, when a state where a detection axis of the acceleration sensor 37 is toward the vertically downward direction represents a reference, whether or not the controller 5 tilts relative to the reference can be determined based on whether or not 1G (gravitational acceleration) is applied to the detection axis, and a degree to which the controller 5 tilts relative to the reference can be determined based on the magnitude of the gravitational acceleration. Further, the multiaxial acceleration sensor 37 subjects, to a processing, the acceleration signals having been detected in the respective axes so as to more specifically determine the degree to which the controller 5 tilts relative to the direction of gravity. In this case, the processor may calculate, based on the output from the acceleration sensor 37, an angle of the tilt at which the controller 5 tilts, or calculate direction in which the controller 5 tilts without calculating the angle of the tilt. Thus, when the acceleration sensor 37 is used in combination with the processor, an angle of tilt or an orientation of the controller 5 may be determined.

On the other hand, in a case where it is anticipated that the controller 5 will be in a dynamic state (a state where the controller 5 is being moved), the acceleration sensor 37 detects an acceleration based on a movement of the controller 5, in addition to the gravitational acceleration. Therefore, when the gravitational acceleration component is eliminated from the detected acceleration through a predetermined process, it is possible to determine a direction in which the controller 5 moves. Even when it is anticipated that the controller 5 will be in the dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing, before outputting to the microcomputer 42 an acceleration signal detected by the acceleration detection means incorporated therein, any desired processing of the acceleration signal. For example, when the acceleration sensor 37 is intended to detect static acceleration (for example, gravitational acceleration), the embedded or dedicated processor could convert the acceleration signal to a corresponding angle of tilt (or another preferable parameter).

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. Data transmitted from the gyro sensor unit 7 is inputted to the microcomputer 42 through the connector 33. Hereinafter, a structure of the gyro sensor unit 7 will be described.

The gyro sensor unit 7 includes the plug 53, a microcomputer 54, the two-axis gyro sensor 55, and the one-axis gyro sensor 56. As described above, the gyro sensor unit 7 detects angular velocities around three axes (XYZ axes in the present embodiment), respectively, and transmits data (angular velocity data) representing the detected angular velocities, to the controller 5.

The two-axis gyro sensor 55 detects an angular velocity (per unit time) around each of the X-axis and the Y-axis. Further, the one-axis gyro sensor 56 detects an angular velocity (per unit time) around the Z-axis. In the present invention, directions of the rotations around the Z-axis, the X-axis, and the Y-axis relative to the imaging direction (the Z-axis positive direction) of the controller 5 are referred to as a roll direction, a pitch direction, and a yaw direction, respectively. That is, the two-axis gyro sensor 55 detects angular velocities in the roll direction (direction of rotation around the X-axis) and the pitch direction (direction of rotation around the Y-axis), and the one-axis gyro sensor 56 detects an angular velocity in the yaw direction (the direction of rotation around the Z-axis).

In the present embodiment, the two-axis gyro sensor 55 and the one-axis gyro sensor 56 are used so as to detect the angular velocities around the three axes. However, in another embodiment, the number of gyro sensors and a combination thereof to be used may be optionally selected provided that the angular velocities around the three axes can be detected.

Further, in the present embodiment, for the purpose of facilitating calculation, the three axes around which the gyro sensors 55 and 56 detect the angular velocities are set to correspond to three axes (XYZ-axes), respectively, for which the acceleration sensor 37 detects the accelerations. However, in another embodiment, the three axes around which the gyro sensors 55 and 56 detect the angular velocities need not correspond to the three axes for which the acceleration sensor 37 detects the accelerations.

Data representing the angular velocities detected by the gyro sensors 55 and 56 are outputted to the microcomputer 54. Therefore, data representing the angular velocities around the three axes of the X, Y, and Z axes are inputted to the microcomputer 54. The microcomputer 54 transmits the data representing the angular velocities around the three axes, as angular velocity data, to the controller 5 through the plug 53. The transmission from the microcomputer 54 to the controller 5 is sequentially performed at a predetermined cycle, and the game is typically processed at a cycle of 1/60 seconds (corresponding to one frame time), and the transmission is preferably performed at a cycle shorter than a cycle of 1/60 seconds.

The controller 5 will be described again. Data outputted from the operation section 32, the imaging information calculation section 35, and the acceleration sensor 37 to the microcomputer 42, and data transmitted from the gyro sensor unit 7 to the microcomputer 42 are temporarily stored in the memory 43. The data are transmitted as the operation data to the game apparatus 3. At a timing of the transmission to the wireless controller module 19 of the game apparatus 3, the microcomputer 42 outputs the operation data stored in the memory 43 to the wireless module 44. The wireless module 44 uses, for example, the Bluetooth technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The wireless controller module 19 of the game apparatus 3 receives the low power radio wave signal. The game apparatus 3 demodulates or decodes the received low power radio wave signal to obtain the operation data. Based on the obtained operation data and the game program, the CPU 10 of the game apparatus 3 performs the game process. The wireless transmission from the communication section 36 to the wireless controller module 19 is sequentially performed at a predetermined time interval. Since game process is generally performed at a cycle of 1/60 sec. (corresponding to one frame time), data is preferably transmitted at a cycle of a shorter time period. The communication section 36 of the controller 5 outputs, to the wireless controller module 19 of the game apparatus 3, the respective operation data at intervals of 1/200 seconds, for example.

When the controller 5 is used, a player is allowed not only to perform a conventional typical game operation of pressing the respective operation buttons, but also to perform an operation of tilting the controller 5 at a desired angle of tilt. Other than these operations, by using the controller 5, a player is allowed to perform an operation of designating a desired position on a screen, or perform an operation of moving the controller 5 itself.

Next, a summary of a game and processing to be executed in the present embodiment will be described. In the processing of the present embodiment, a virtual game world (hereinafter, simply referred to as a game world) which is a stage of the game is created in a virtual three-dimensional game space (hereinafter, simply referred to as a virtual game space). Two "world states" are defined for the virtual game world. The two "world states" are defined such that the respective contents of worlds in the two "world states" created in the same place in the virtual game space are different from each other, like a "present world" and a "past world", for example. Examples of the contents of worlds to be created in a place include a state or an attribute of terrain, a virtual weather state, an appearance, a behavior, or an attribute of an object in the place. In the present embodiment, data for defining the two "world states" are prepared. Normally, a world based on data for a "first state" is created in the entire area of the virtual game space, and then the player progresses the game. Meanwhile, when a predetermined condition is satisfied during the game, a world based on data for a "second state" is created in a certain area of the virtual game space. That is, the game world becomes such that the "first state" and the "second state" are present at the same time in one virtual game space. In addition, a time limit during which the two world states are present at the same time is set. Moreover, in the present embodiment, processing is performed such that the two world states are displayed on the same game screen. That is, a game screen is generated such that the boundary between two areas of the two world states is included in the game screen. As a result, the player can progress the game while viewing the two world states. Thus, for example, by the world state varying as described above, it becomes possible to enter a place which the player has thought it impossible to enter, whereby unexpectedness of development of the game increases, and further, amusingness of the game increases.

Figure 8:
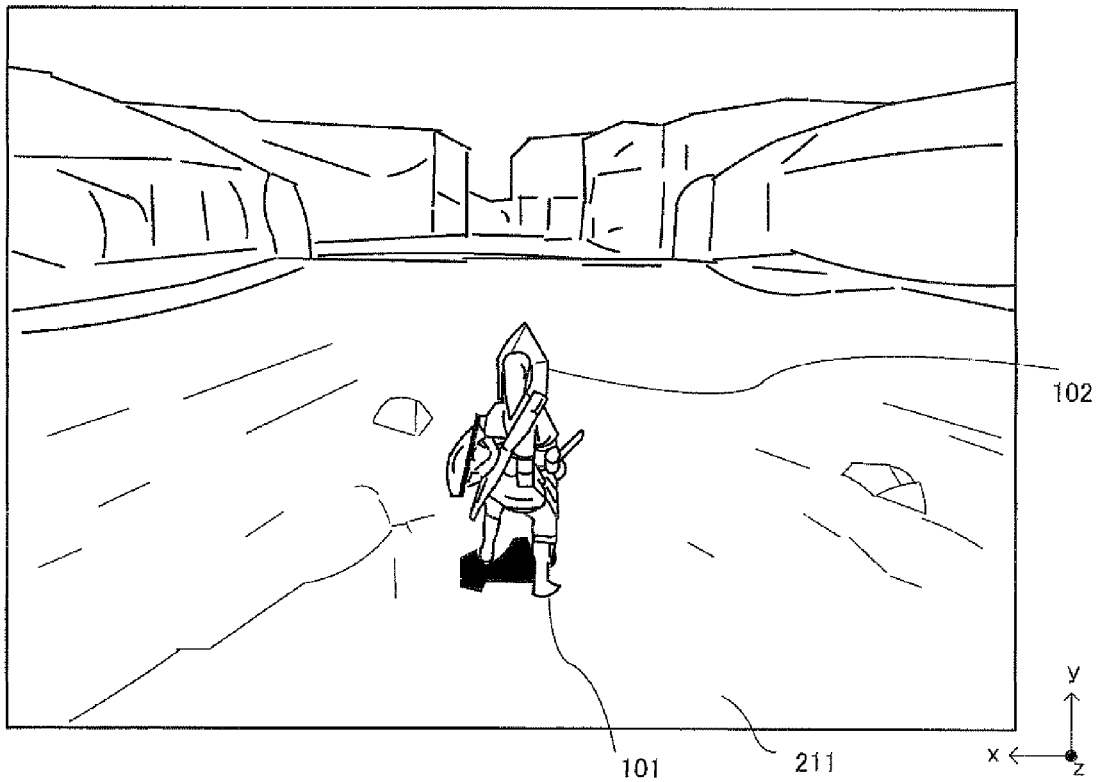
FIG. 8 is an example of a game screen assumed in an embodiment.

Hereinafter, the above content will be described more specifically, with use of the drawings. FIG. 8 is an example of a game screen assumed in the present embodiment. In FIG. 8, a game world created as a virtual three-dimensional space is displayed, and a player object 101 which is an object to be operated by the player is also displayed. In addition, a crystal object 102 is displayed in front of the player object 101. In addition, a virtual camera, which is not shown, is basically placed in back of the player object 101. The position and the like of the virtual camera are controlled such that the virtual camera follows the player object 101.

The two "world states" as described above are set for the game world assumed in the present embodiment. Specifically, one is a "present world" and the other one is a "past world". In addition, in the game of the present embodiment, the "present world" is set and defined as a wilderness world, and the "past world" is set and defined as a verdant world, in advance. Basically, the player progresses the game in a state where the "present world" is set as the stage of the game. That is, in a state shown in FIG. 8, the entirety of an area 211 of the game world displayed on the game screen is the "present world". Note that a part of the area 211 corresponding to the "present world" is changed to the "past world" by the player performing a predetermined operation described below (or by a predetermined condition being satisfied).

Figure 9:
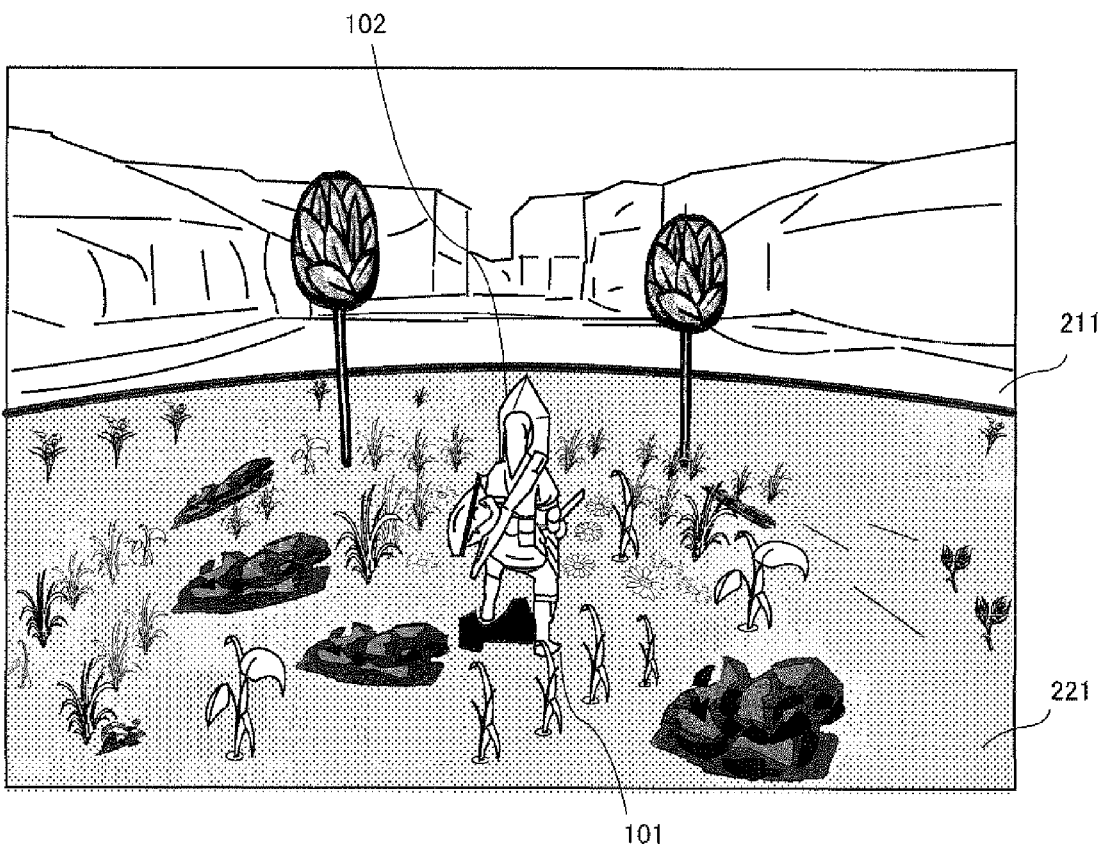
FIG. 9 is another example of a game screen assumed in the present embodiment.
Figure 10:
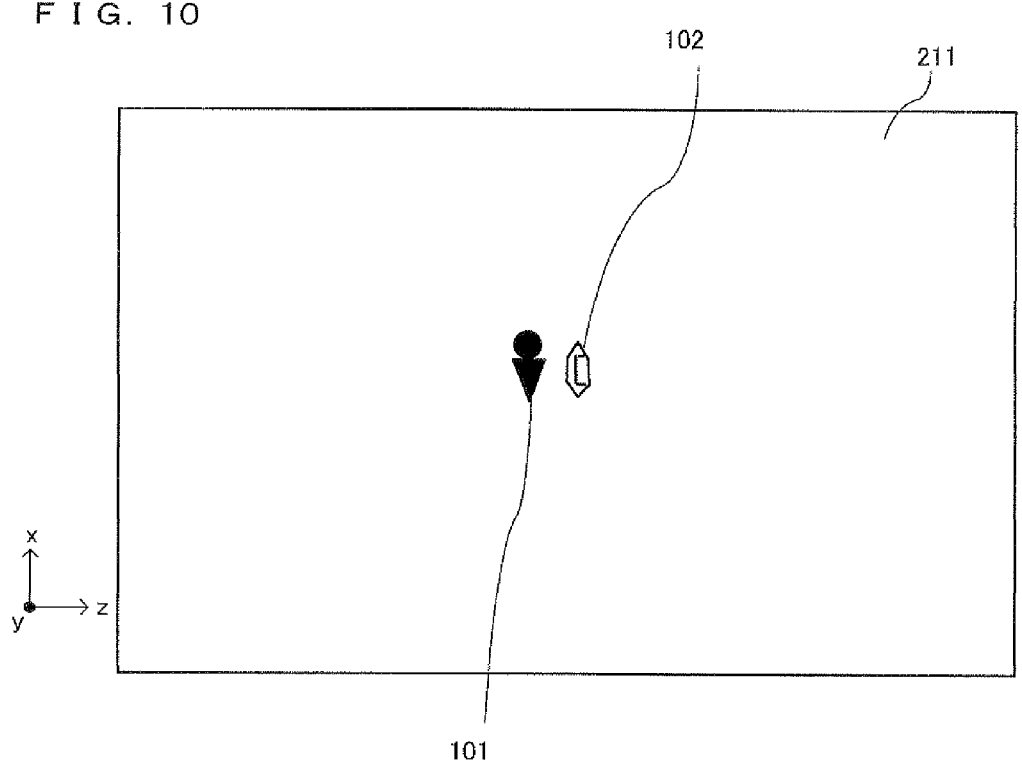
FIG. 10 is a schematic diagram obtained by looking down upon a state shown in FIG. 8 from above.
Figure 11:
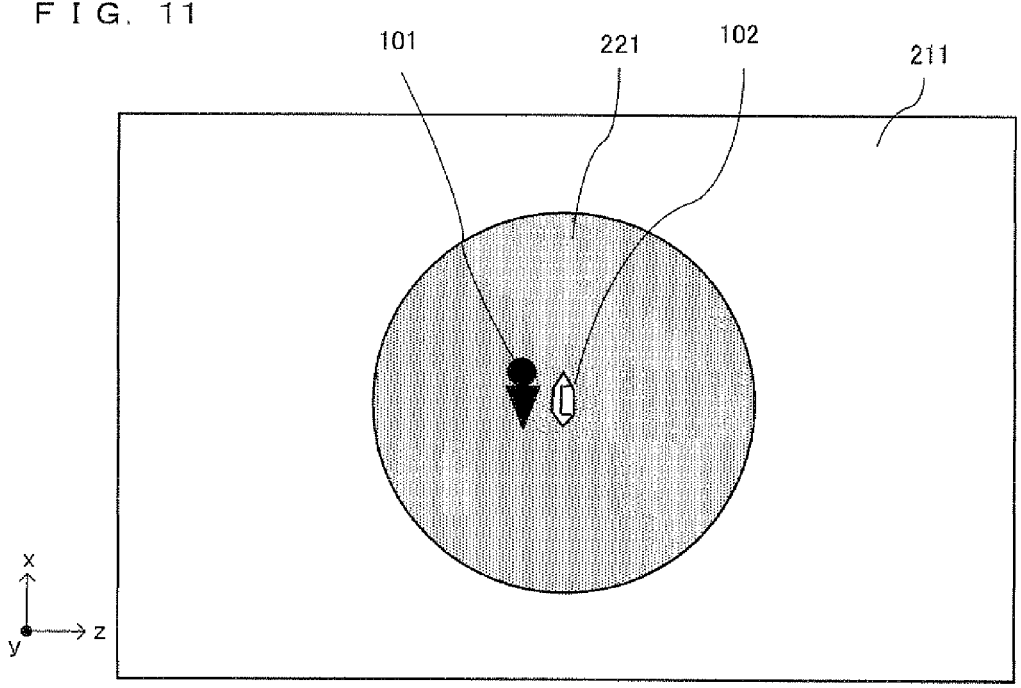
FIG. 11 is a schematic diagram obtained by looking down upon a state shown in FIG. 9 from above.

Specifically, the crystal object 102 is a switch for changing a part of the area 211. When the player has performed an operation of turning on the switch (hereinafter, referred to as a crystal switch) (e.g., when the player object 101 attacks or hits the crystal object 102), an area 221 which is a part of the "present world" becomes the "past world", as shown in FIG. 9. Here, setting of the game is such that the "past world" is "transferred" to the area 221. Therefore, hereinafter, the area 221 is referred to as a transfer area 221. FIG. 10 and FIG. 11 are schematic diagrams obtained by looking down upon states shown in FIG. 8 and FIG. 9 from above, respectively. FIG. 10 corresponds to the states shown in FIG. 8, and the entirety of the area 211 in the game space is the "present world". On the other hand, FIG. 11 corresponds to the state shown in FIG. 9. The inside of the circular transfer area 221 is the "past world", and the area 211 outside the circular transfer area 221 is the "present world". That is, when the crystal switch is turned on, the circular transfer area 221 whose center (reference position) is at the position of the crystal object 102 is calculated, and the inside of the transfer area 221 is set as the "past world". Then, the "past world" is created in the transfer area 221. At this time, on the screen, the transfer area 221 is displayed by using an effect in which the transfer area 221 is circularly expanded to a predetermined size around the crystal object 102. As a result, the "present world" and the "past world" are displayed at the same time on the game screen as shown in FIG. 9.

Figure 12:
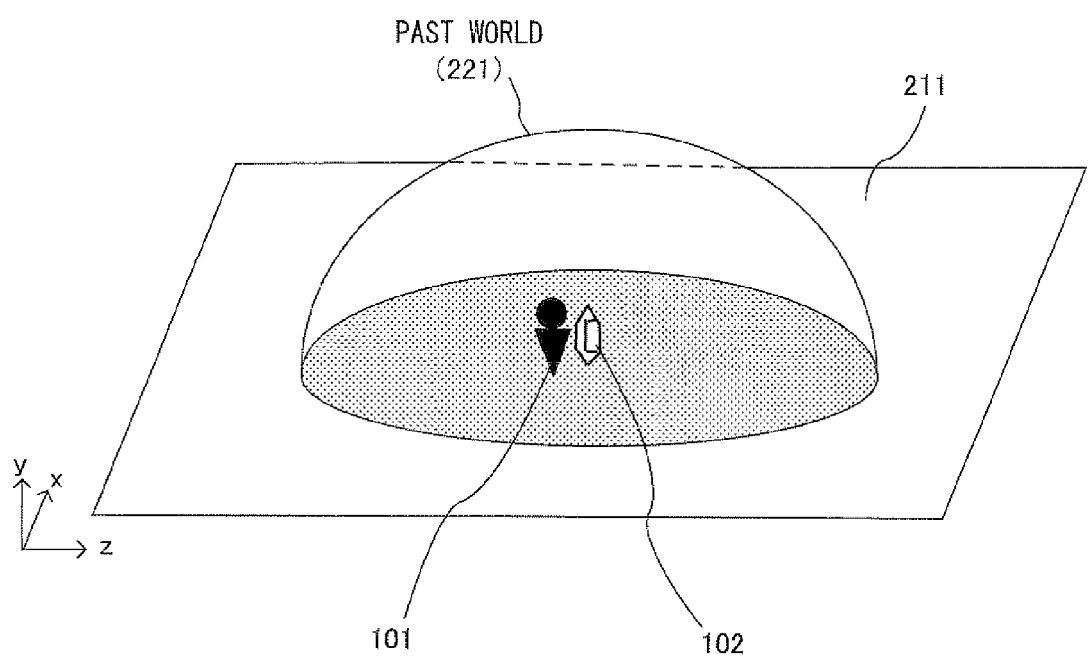
FIG. 12 is a schematic diagram showing a transfer area.

Here, since in the present embodiment, the virtual game space is created as a three-dimensional space, the "past world" is, to be exact, a dome-like space as shown in FIG. 12. However, for convenience of description, the following description always uses the expression "transfer area 221" or "past world", under the condition that the transfer area 221 (past world) includes a concept of such a three-dimensional space. Note that the "past world" (transfer area 221) is not limited to a dome-like space as described above, and may be set as a cylindrical space.

As described above, when the crystal switch is turned on, a certain area (transfer area 221) of the virtual game space is set as the "past world", and a time limit during which the certain area is set as the "past world" is provided. For example, when ten seconds have passed after the crystal switch is turned on, the certain area set as the transfer area 221 is returned to the "present world". At this time, the game screen displays the circular transfer area 221 reducing like being focused on the crystal object 102. As a result, in the present embodiment, the transfer area 221 until disappearance from generation is depicted as follows, for example. First, when the crystal switch is turned on, the game screen displays a scene in which the transfer area 221 circularly expands and becomes a predetermined size in about one second. Thereafter, the size of the transfer area 221 does not vary for twenty seconds. When the twenty seconds have passed, the game screen displays a scene in which the transfer area 221 is reduced and disappears in about one second.

When the "present world" and the "past world" are present at the same time as described above, states or behaviors of objects other than the player object 101, appearing in the virtual game space, are controlled so as to differ depending on whether the objects are present in the "present world" or in the "past world". For example, in an example shown in FIG. 9, objects of plants which are not present in the "present world" appear in the transfer area 221. That is, a display state (on/off) of an object differs between the "present world" and the "past world".

Figure 13:
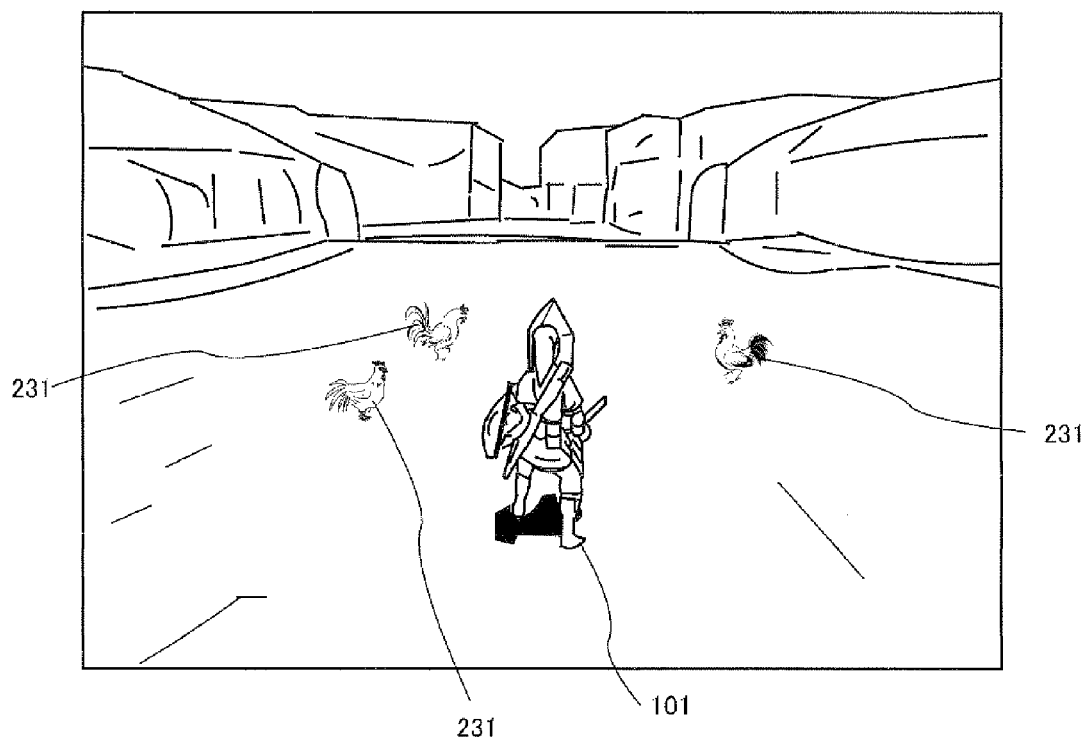
FIG. 13 is another example of a game screen assumed in the present embodiment.
Figure 14:
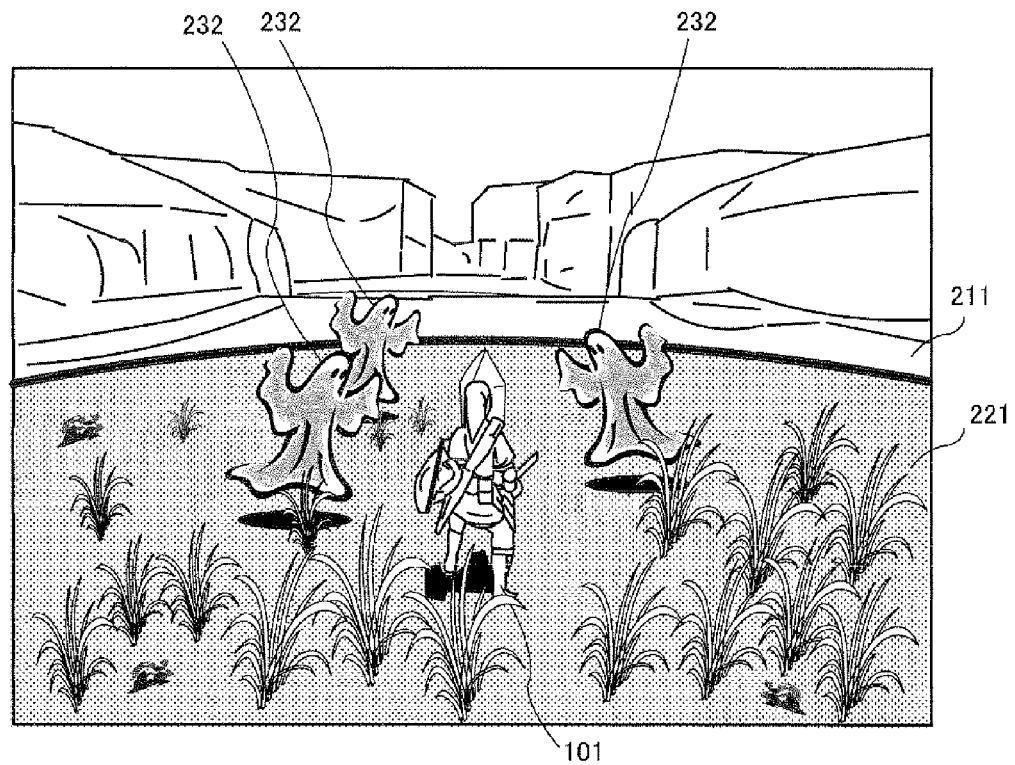
FIG. 14 is another example of a game screen assumed in the present embodiment.

As another example, a chicken object 231 is present in the "present world" as shown in FIG. 13. The chicken object 231 does not attack the player object 101. On the other hand, when the crystal switch is turned on in the state in FIG. 13 and a place where the chicken object 231 is present is set as the "past world", the chicken object 231 changes to a monster object 232 as shown in FIG. 14. Moreover, the monster object 232 rushes at the player object 101. That is, the appearance (state) of an object changes, and the behavior (action) of the object also changes.

In addition, as another example, a monster object of an insect type is depicted as an adult in the "present world", and is depicted as a larva in the "past world". In addition, in this case, the monster object may behave differently between an adult and a larva.

Figure 15:
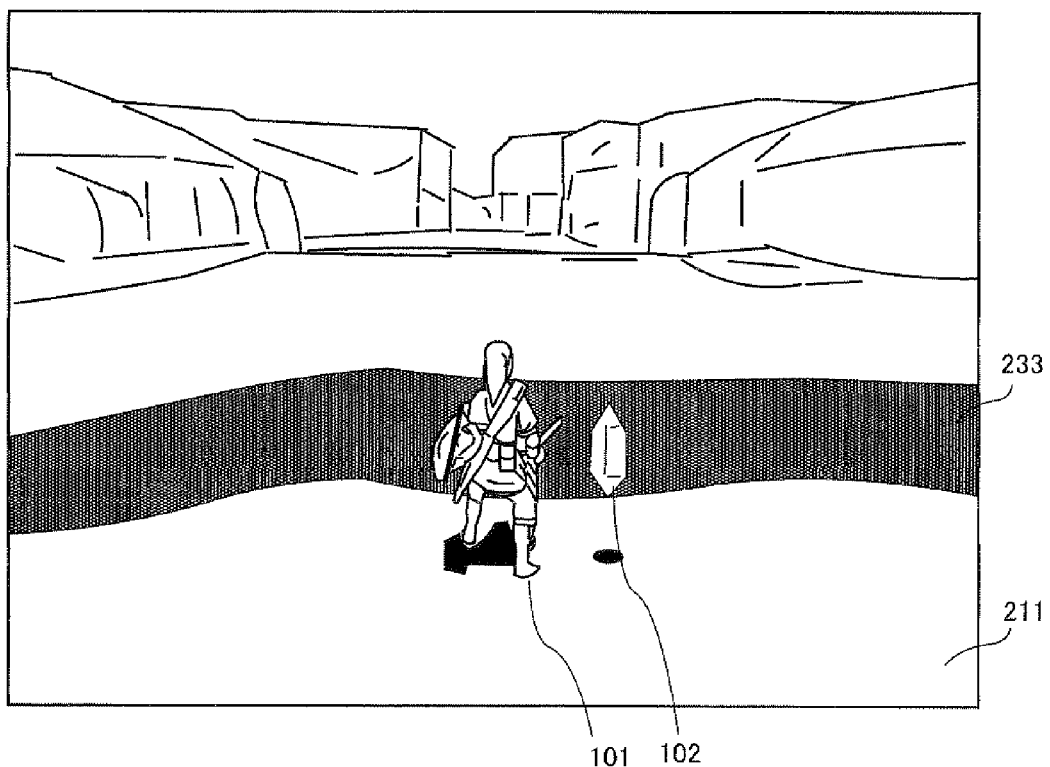
FIG. 15 is another example of a game screen assumed in the present embodiment.
Figure 16:
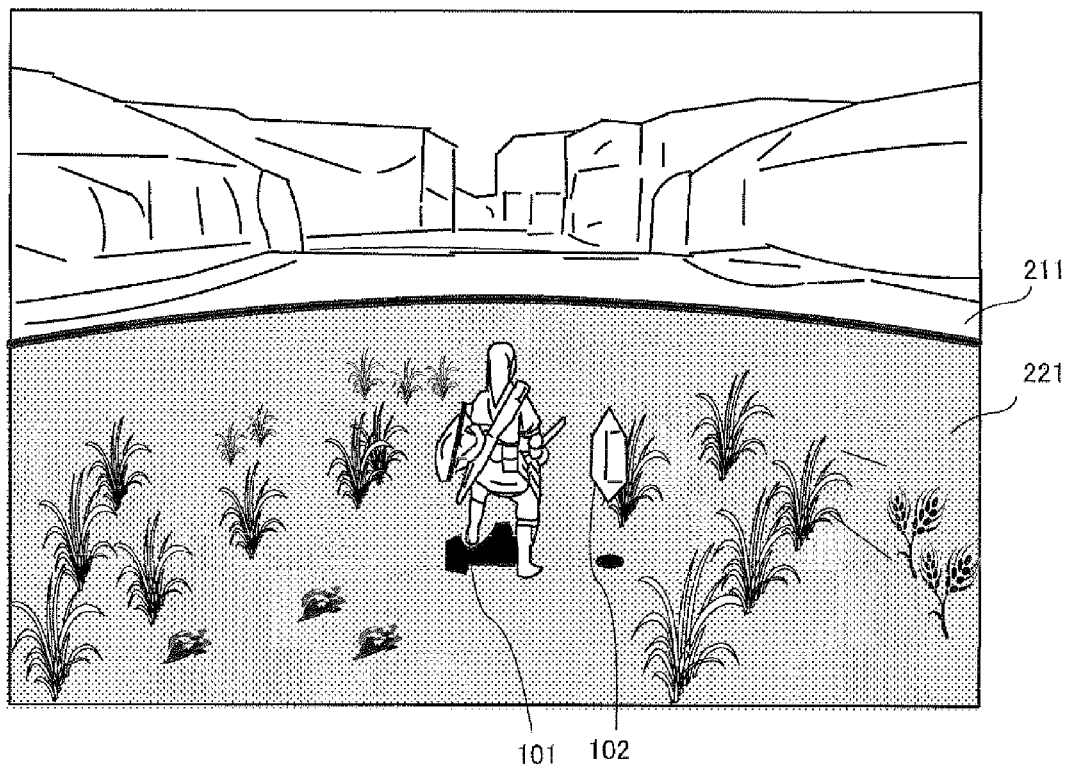
FIG. 16 is another example of a game screen assumed in the present embodiment.

In addition, a state shown in FIG. 15 is another example. In FIG. 15, a quicksand object 233 is placed in front of the player object 101 (that is, a part of a ground is quicksand). In the game, if the player object 101 enters the quicksand object 233, the player object 101 sinks into the quicksand object. Therefore, in the state shown in FIG. 15, the player object 101 cannot be moved to the opposite side of the quicksand object 233. Here, if a crystal switch present on the side of the player object 101 is turned on, a certain area whose center is at the position of the crystal object 102 is set as the transfer area 221, that is, the "past world", as shown in FIG. 16. As a result, the quicksand object 233 changes to a ground object on which the player object 101 can pass. Thus, it becomes possible to move the player object 101 forward. As described above, it is also possible to vary terrain between the "present world" and the "past world".

Figure 17:
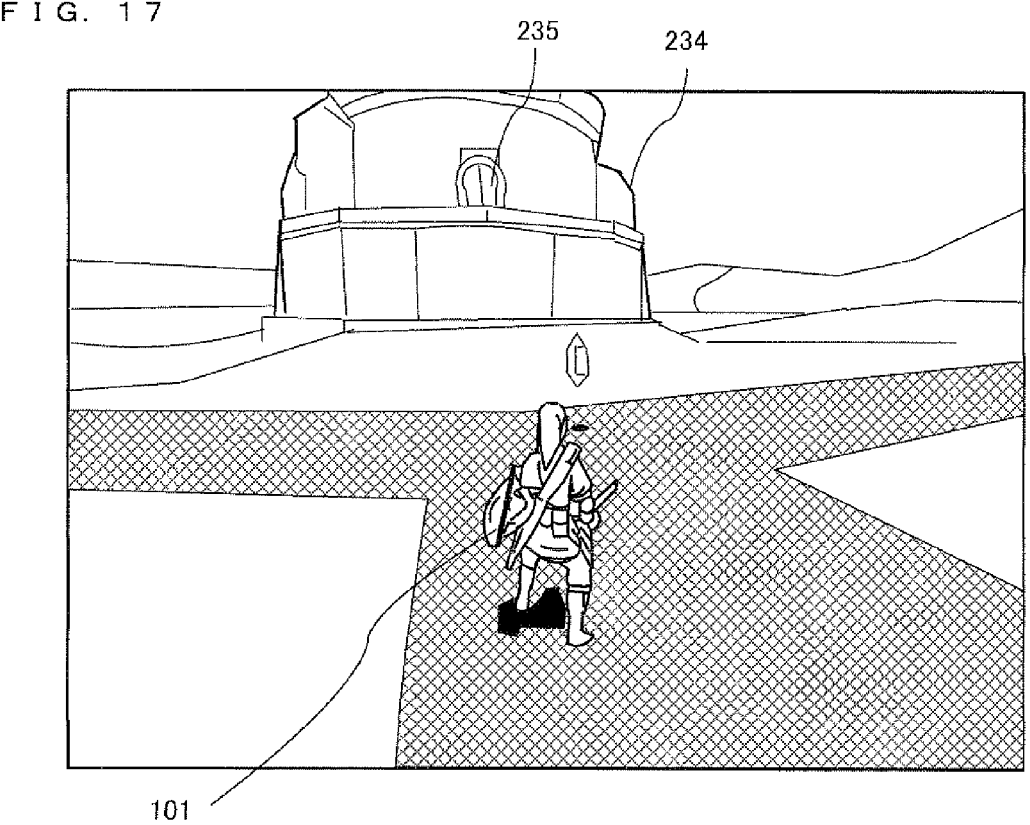
FIG. 17 is another example of a game screen assumed in the present embodiment.
Figure 18:
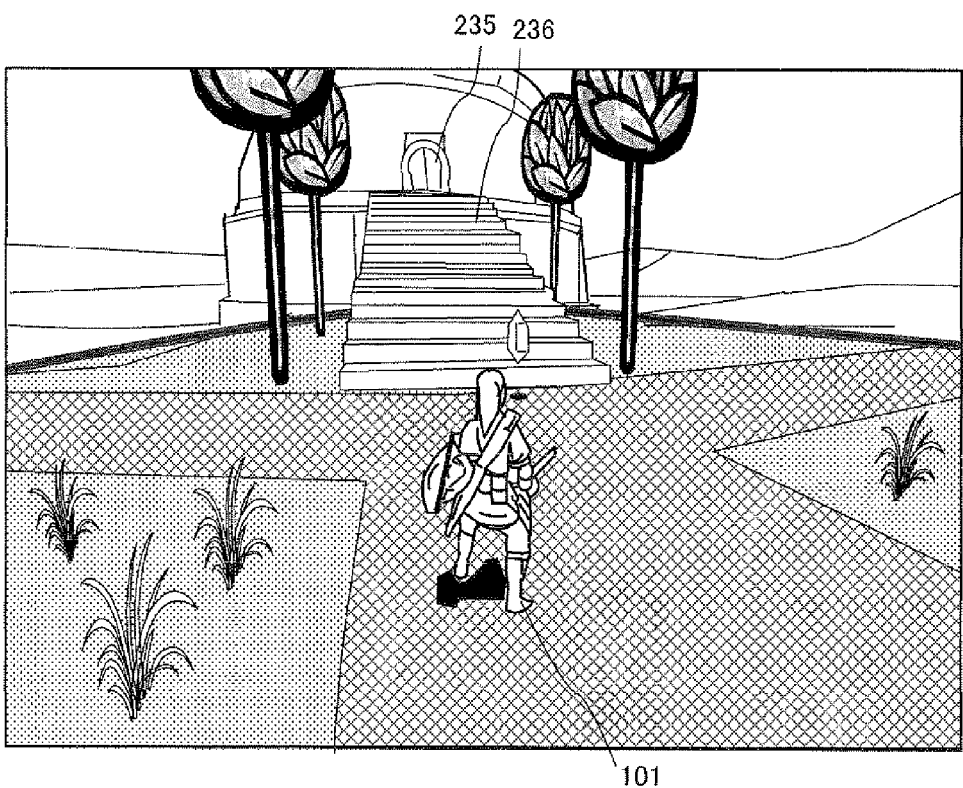
FIG. 18 is another example of a game screen assumed in the present embodiment.

In addition, a state shown in FIG. 17 is another example. In FIG. 17, a construction object 234 is present in front of the player object 101. The construction object 234 has a door 235. The door 235 is present at a higher place than a place where the player object 101 is present. Therefore, in the state shown in FIG. 17, the player object 101 cannot enter the door 235. Here, if a crystal switch near the player object 101 is turned on, a certain area is set as the transfer area 221 as shown in FIG. 18. Then, a stair object 236 which is not present in the "present world" appears in the transfer area 221. As a result, it becomes possible to cause the player object 101 to climb the stair object 236 to reach the door 235.

Other than the above, it is also conceivable to cause a "bridge object" which is not present in the "present world" to appear in the "past world", as in the stair object 236. That is, as an example, if a place which the player object 101 cannot pass is present in the "present world", an area including the place is changed to the "past world" to allow the player object 101 to pass the place. In addition, other than this, for example, a case where an object has the same appearance but has different sizes between the "present world" and the "past world", or a case where a robot object, an object such as "moving floor", or the like which are deactivated in the "present world" are activated in the "past world", is conceivable. In addition, for example, a case where a weather state varies like it is snowing in the "past world" but it is not snowing in the "present world", or a case where an object displayed as a bone object (i.e., dead human) in the "present world" is displayed as an alive human object and can move around in the "past world", is conceivable.

Figure 19:
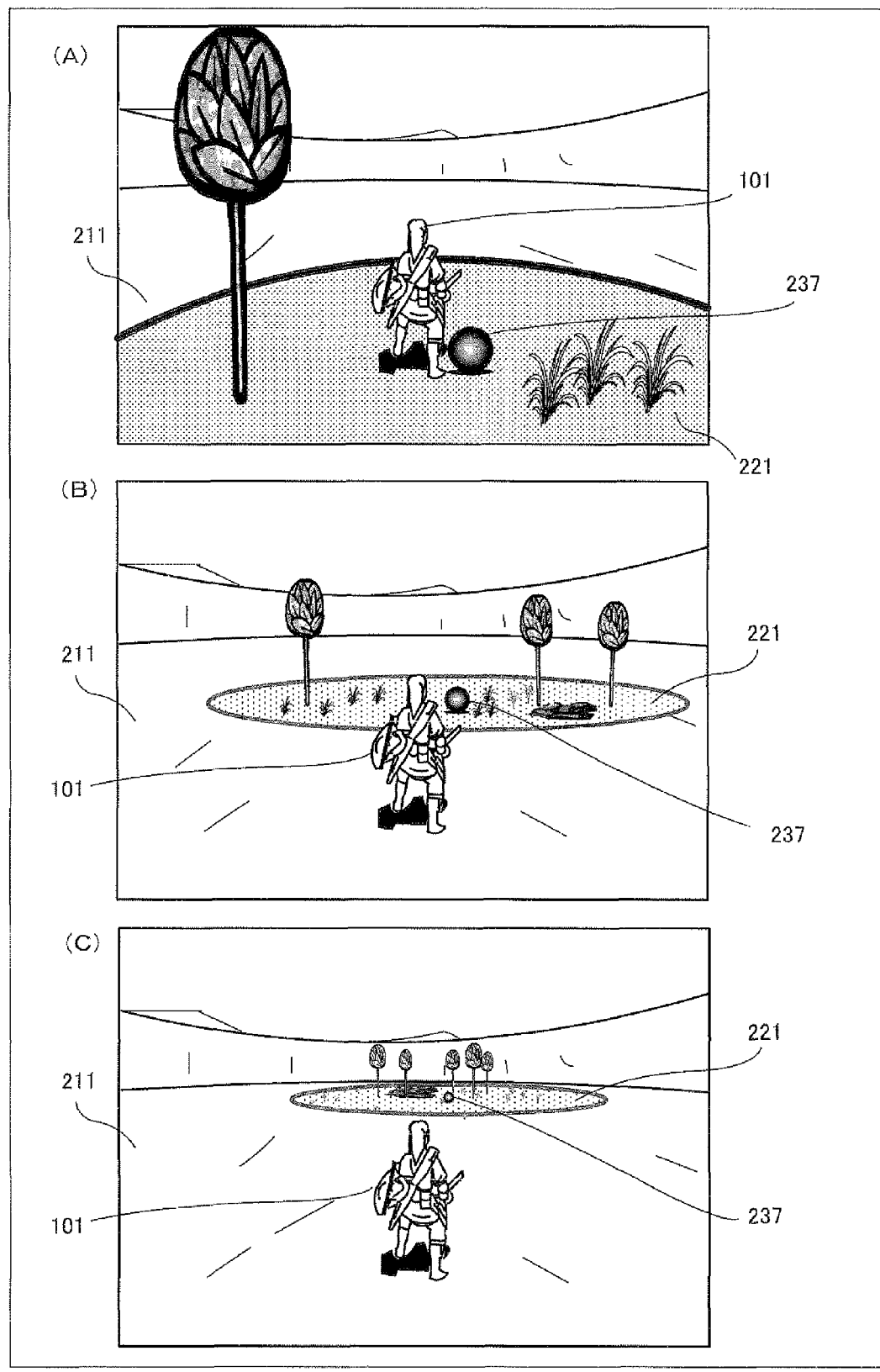
FIG. 19 is another example of a game screen assumed in the present embodiment.

In addition, although in the present embodiment, the crystal object 102 is used as an example of a switch for setting an area of the "past world", other than this, a spherical object which is movable may be used as such a switch, for example. In this case, the center of the transfer area 221 set as the "past world" is the position of the spherical object. If the spherical object is rolled, the position of the transfer area 221 varies in real time along with the movement of a spherical object 237 as shown in FIGS. 19(A), (B), and (C). In addition, if the player object 101 holds up the spherical object 237 and then moves while holding the spherical object 237, the position of the transfer area 221 also moves in real time along with the movement of the player object 101. In addition, in this case, a timing at which the "past world" appears may be such that for example, the "past world" appears when the spherical object 237 is placed at a predetermined position. More specifically, if the spherical object 237 is placed at a predetermined position, the spherical object 237 is charged with "energy" (a remaining amount of the energy corresponds to the above-described time limit). Then, processing of causing the "past world" to appear until the stored energy runs out, may be performed.

As described above, in the present embodiment, a certain area of the "present world" is set as the "past world" with a time limit being provided, and the "past world" is created at the certain area. Then, a state or a behavior of an object other than the player object 101 varies depending on whether the object is present in the "present world" or in the "past world". In addition, the two areas are displayed on one game screen. Thus, the player can progress the game while viewing the conditions of the "present world" and the "past world", thereby enhancing amusingness of the game.

Figure 20:
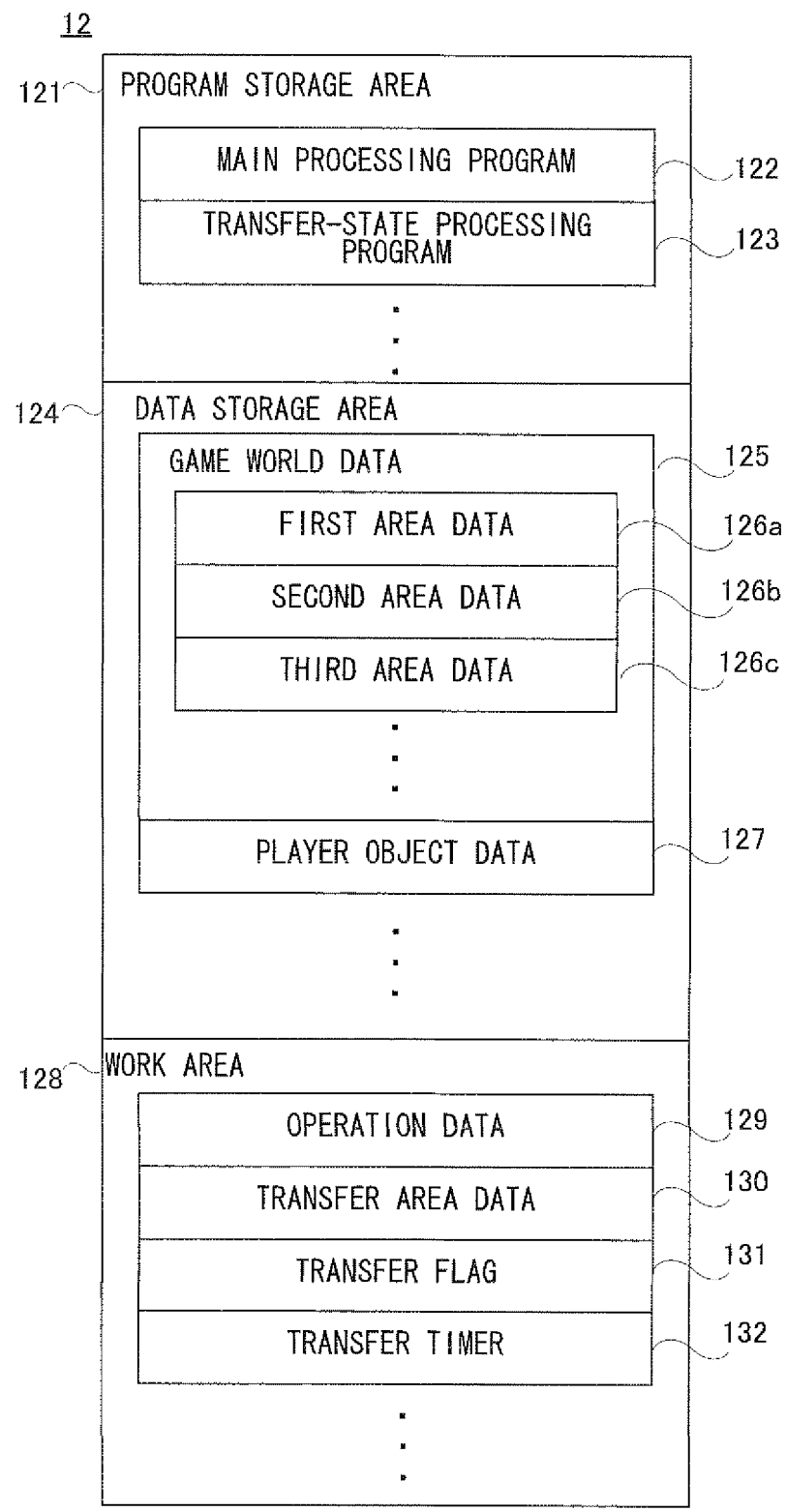
FIG. 20 is a diagram showing a memory map of a main memory 12 of the game apparatus 3.

Next, game processing to be executed by the game apparatus 3 will be described in detail. First, data stored in the external main memory 12 when the game processing is performed will be described. FIG. 20 is a diagram showing a memory map of the external main memory 12 of the game apparatus 3. As shown in FIG. 20, the external main memory 12 includes a program storage area 121, a data storage area 124, and a work area 128. Data of the program storage area 121 and data of the data storage area 124 are stored in the optical disc 4, and are transferred to and stored in the external main memory 12 when the game processing is performed. Data of the work area 128 is temporarily created and used as appropriate during execution of the game processing.

The program storage area 121 stores a game program to be executed by the CPU 10. The game program includes a main processing program 122, a transfer-state processing program 123, and the like. The main processing program 122 relates to processing shown by a flowchart in FIG. 25 described later. The transfer-state processing program 123 is used for causing the CPU 10 to execute processing of setting a certain area as the "past world" as described above, or processing of controlling an object in each of the "present world" and the "past world".

The data storage area 124 stores data such as game world data 125 and player object data 127. The game world data 125 is used for creating a virtual game space according to the present embodiment. In the present embodiment, the virtual game space is defined by dividing it into a plurality of areas, e.g., a wilderness area, a grassland area, and a marsh area. Respective pieces of data for creating the areas are defined as first area data 126a (corresponding to the wilderness area), second area data 126b (corresponding to the grassland area), third area data 126c (corresponding to the marsh area), etc.

Here, classification of objects other than the player object 101 in the present embodiment will be described before describing the above data. In the present embodiment, objects other than the player object 101 are classified into four types, i.e., a field object, a terrain object, an active object, and a nonactive object. Moreover, these four types of objects are appropriately placed in the virtual game space, whereby the above-described areas which form a stage of the game are created.

Next, the four types of objects will be described. First, the field object forms a part (hereinafter, referred to as a field) corresponding to a ground or a water surface in each area. That is, the field object forms a flat part as a base of the game world. The quicksand object 233 shown in FIG. 15 is classified into the field object. Next, the terrain object is an object such as terrain or a construction placed on the field formed by the field object. For example, such an object includes a construction such as a building and a bridge, and terrain such as a cliff and a mountain. Therefore, the active object and the nonactive object can be placed also on the terrain object. That is, the field object and the terrain object form a part like a base or terrain of the game world. Then, the active object, the nonactive object, and the player object are placed on the part.

The active object is mainly a character object such as an enemy object and a non-player object, and is supposed to act autonomously. The nonactive object is a plant object such as grass and a tree, or a background object such as a relatively small stone or rock, and basically, is not supposed to move about (is not supposed to act autonomously). In addition, the crystal object 102 shown in FIG. 8 or the like, and other objects having functions of switches are also treated as the nonactive object.

Figures 21, 22:
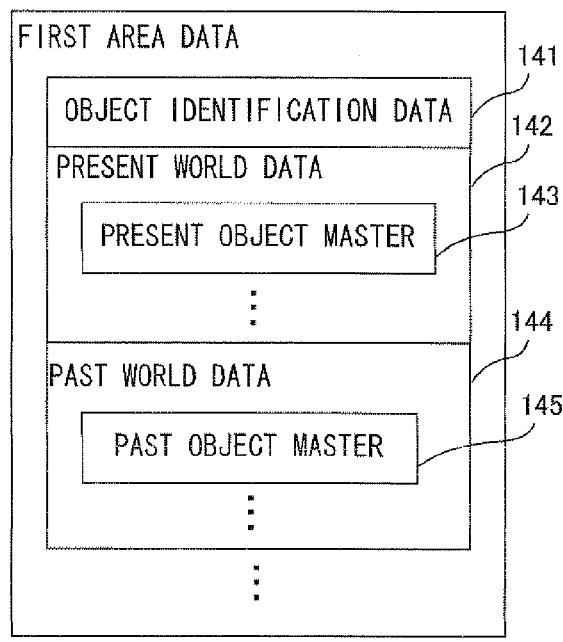

Next, a configuration of the above area data 126 will be described. As an example of the area data 126, FIG. 21 shows an example of a data configuration of the first area data 126*a*. The first area data 126*a* includes object identification data 141, present world data 142, past world data 144, and the like.

The object identification data 141 is used for uniquely identifying all objects forming each area and all objects appearing in each area. FIG. 22 shows an example of a data configuration of the object identification data 141. The object identification data 141 is configured by a collection of object numbers 1411, current positions 1412, and type data 1413. The object numbers 1411 are numbers assigned for identifying the respective objects. The current positions 1412 are three-dimensional coordinate data indicating the current positions of the respective objects in the virtual game space, and are updated as appropriate along with control of actions of the objects. The type data 1413 indicates the types of the objects described above.

Referring to FIG. 21 again, the present world data 142 is data defining a state of an area corresponding to the first area data 126*a* when the area is in the state of the "present world". The present world data 142 includes a present object master 143 and other data (for example, data indicating weather, and data indicating initial positions where the objects are placed) for defining the state of an area in the "present world". The present object master 143 is data defining states, behaviors, and the like of the objects in the "present world". FIG. 23 is an example of a data configuration of the present object master 143. In FIG. 23, the present object master 143 is shown in a table form. The present object master 143 is configured by a collection of object numbers 1431, appearance data 1432, behavior data 1433, and other data 1444.

The object numbers 1431 are numbers assigned for identifying the respective objects, and correspond to the object numbers 1411 of the object identification data 141.

The appearance data 1432 is data defining the appearances of the objects. Specifically, the appearance data 1432 includes polygon data and texture data of the objects. In FIG. 23, for the purpose of facilitating the description, terms directly indicating what appearances the objects have are used.

The behavior data 1433 is data defining the behaviors (for example, action pattern) of the objects. Basically, the behavior data 1433 defines the behavior of an active object which is supposed to autonomously act. However, the behavior data 1433 also defines characteristics (which, for example, cause the player object 101 to sink or burn, or allow the player object 101 to swim) of fields such as the quicksand object 233. In addition, the behavior data 1433 may define the behavior of a nonactive object as appropriate.

The other data 1444 is data other than the above-described data, which is, for example, sound data such as an animal cry.

Note that the present object master 143 actually does not need to be stored in a form of table data. The present object master 143 only needs to be stored so as to enable processing corresponding to processing performed based on such table data.

Referring to FIG. 21 again, the past world data 144 is data defining a state of the area corresponding to the first area data 126*a* when the area is in the state of the "past world". The past world data 144 includes a past object master 145 and other data defining the state of an area in the "past world". The past object master 145 is data defining states, behaviors, and the like of the objects in the "past world".

FIG. 24 is an example of a data configuration of the past object master 145. Basically, the data configuration of the past object master 145 is similar to the present object master 143. The past object master 145 is configured by a collection of object numbers 1451, appearance data 1452, behavior data 1453, and other data 1454. Contents defined by the past object master 145 do not necessarily coincide with those defined by the present object master 143 though significance of the data included in the past object master 145 is the same as that included in the present object master 143. For example, the appearance of an object whose object number 1411 (1431 or 1451) is "001" is defined as a "quicksand" in the "present world" (which corresponds to the quicksand object 233 in FIG. 15). On the other hand, the appearance of the object is defined as a "grassland" in the "past world". In addition, the appearance of an object whose object number 1411 is "003" is defined as a "chicken" in the "present world", and is defined as a "monster" in the "past world". In addition, the behavior of the object is also defined as different contents. That is, each of the state and the behavior of an object, to which one object number is assigned, varies between the "present world" and the "past world". Note that in the above example, data for the objects corresponding to the object numbers 1411 is stored in the present object master 143 and in the past object master 145. However, for example, if there is an object which is present in the "present world" but is not present in the "past world", data for the object may not be stored in the past object master 145 though being stored in the present object master 143.

Referring to FIG. 20 again, the player object data 127 is data defining the player object 101.

Next, data stored in the work area 128 will be described. The work area 128 stores operation data 129, transfer area data 130, a transfer flag 131, a transfer timer 132, and the like.

The operation data 129 is operation data transmitted from the input apparatus 8 to the game apparatus 3. In the present embodiment, the operation data is transmitted from the input apparatus 8 to the game apparatus 3 at the rate of once per $\frac{1}{200}$ second. Therefore, the operation data 129 stored in the external main memory 12 is updated at the rate. In the present embodiment, only the latest operation data 129 (which has been obtained last) needs to be stored in the external main memory 12.

The transfer area data 130 is coordinate data indicating a range of the transfer area 221 set as the "past world" as described above. If a position of an object other than the player object 101 is included within the range, control of the object is performed with reference to the past object master 145, and if the position is not included within the range, control of the object is performed with reference to the present object master 143.

The transfer flag 131 is a flag indicating whether or not the "past world" needs to be set. As described above, in the present embodiment, the "past world" appears during a time limit. Therefore, the transfer flag 131, in other words, is a flag indicating whether or not the time limit has run out. When the transfer flag 131 is set on, a certain area is set as the "past world" (the "past world" appears), and when the transfer flag 131 is set off, the "past world" does not appear.

The transfer timer 132 is a timer for timing during the above-described time limit. In the present embodiment, "0" is set as an initial value of the transfer timer 132, and the transfer timer 132 begins counting when the aforementioned crystal switch is turned on. Then, the "past world" appears until the transfer timer 132 counts to "20".

Other than the above, various flags and data which are temporarily necessary in game processing are generated, and stored in the work area 128.

Figure 25:
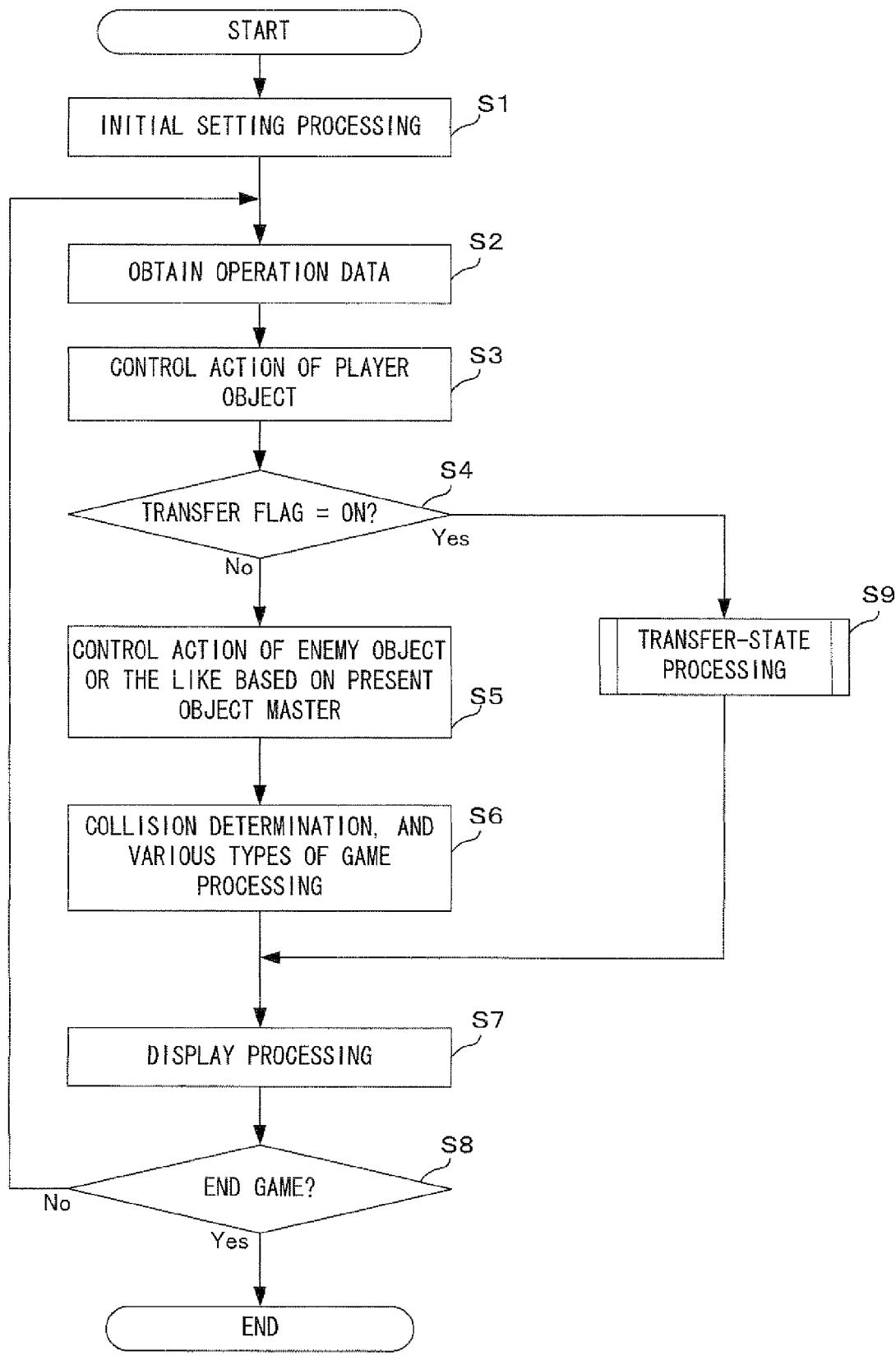
FIG. 25 is a flowchart showing game processing according to the present embodiment.

Next, referring to FIG. 25 to FIG. 30, game processing executed by the game apparatus 3 will be described. When the game apparatus 3 is powered on, the CPU 10 of the game apparatus 3 executes a start-up program stored in the ROM/RTC 13, and thereby each unit such as the external main memory 12 is initialized. Then, the game program stored in the optical disc 4 is loaded into the external main memory 12, and the CPU 10 starts to execute the game program. FIG. 25 is a flowchart showing a game process performed after the game program is started and a predetermined area, e.g., the wilderness area, to be used as a stage of the game, is selected. Note that in the flowchart shown in FIG. 25, game processing of setting the above-described certain area as the "past world" and releasing the setting, and game processing of controlling an object will mainly be described, and the detailed description of other game processing which is not directly related to the present invention is omitted.

Referring to FIG. 25, first, in step S1, initial setting processing of creating a virtual game space corresponding to the selected area is executed. Specifically, the area data 126 corresponding to the selected area is loaded from the game world data 125. Here, a case where the first area is selected and the first area data 126a is loaded will be described below as an example. Next, with reference to the present object master 143, various objects forming an area which becomes a stage of the game are generated and appropriately placed in the virtual game space (note that when the game is started, the "present world" is set first). In addition, the player object 101 is also generated and appropriately placed. Other than these, initialization of various flags is executed. Next, a game image representing a game space created as described above is generated, and the generated game image is displayed on the monitor 2. Thereafter, a processing loop indicated by steps S2 to S9 is repeated every frame, thereby progressing the game.

Next, in step S2, the operation data 129 is obtained. In subsequent step S3, an action of the player object 101 is controlled based on the operation data 129.

Next, in step S4, whether or not the transfer flag 131 is on is determined. That is, whether or not the "past world" is appearing is determined. As a result of the determination, if it is determined that the transfer flag 121 is not on (NO in step S4), in subsequent step S5, an action of an object other than the player object 101 is controlled with reference to the present object master 143. For example, an enemy object is controlled to attack the player object 101.

Next, in step S6, collision determination and various types of game processing are executed. Specifically, collision determination with respect to collision of the player object 101 which has been controlled as described above with various objects, e.g., an enemy object, is performed. For example, whether or not an attack has hit an object, or whether or not the player object 101 is on quicksand (whether or not the player object 101 is in contact with quicksand), is determined. In addition, whether or not the aforementioned crystal switch is turned on is also determined by performing collision determination with respect to collision between the crystal object 102 and the player object 101. Then, various types of game processing are executed in accordance with a result of the determination. Here, if it is determined that the crystal object 102 and the player object 101 come in contact with each other (the crystal switch is turned on), the transfer flag 131 is set on (as a result, in the processing loop of next frame, determination in step S4 is YES, and then processing in step S9 described later is performed). In addition, when it is determined that the crystal switch is turned on, the transfer timer 132 is reset and starts to count.

After the collision determination and various types of game processing as described above are finished, next, in step S7, a virtual game space in which the control of actions of objects and the game processing as described above are reflected is shot by the virtual camera (is rendered), thereby generating a game screen. Then, the generated game screen is displayed on the monitor 2. Therefore, if the transfer flag 131 is on, two world states, i.e., the "present world" and the "past world" are displayed on the monitor 2.

Next, in step S8, whether or not a condition for ending the game is satisfied is determined. For example, whether or not a player has performed an operation of ending the game, or whether or not the first area is completed, is determined. As a result, if a condition for ending the game is not satisfied (NO in step S8), processing is performed from step S2 again. On the other hand, if a condition for ending the game is satisfied (YES in step S8), the game process is ended.

Figure 26:
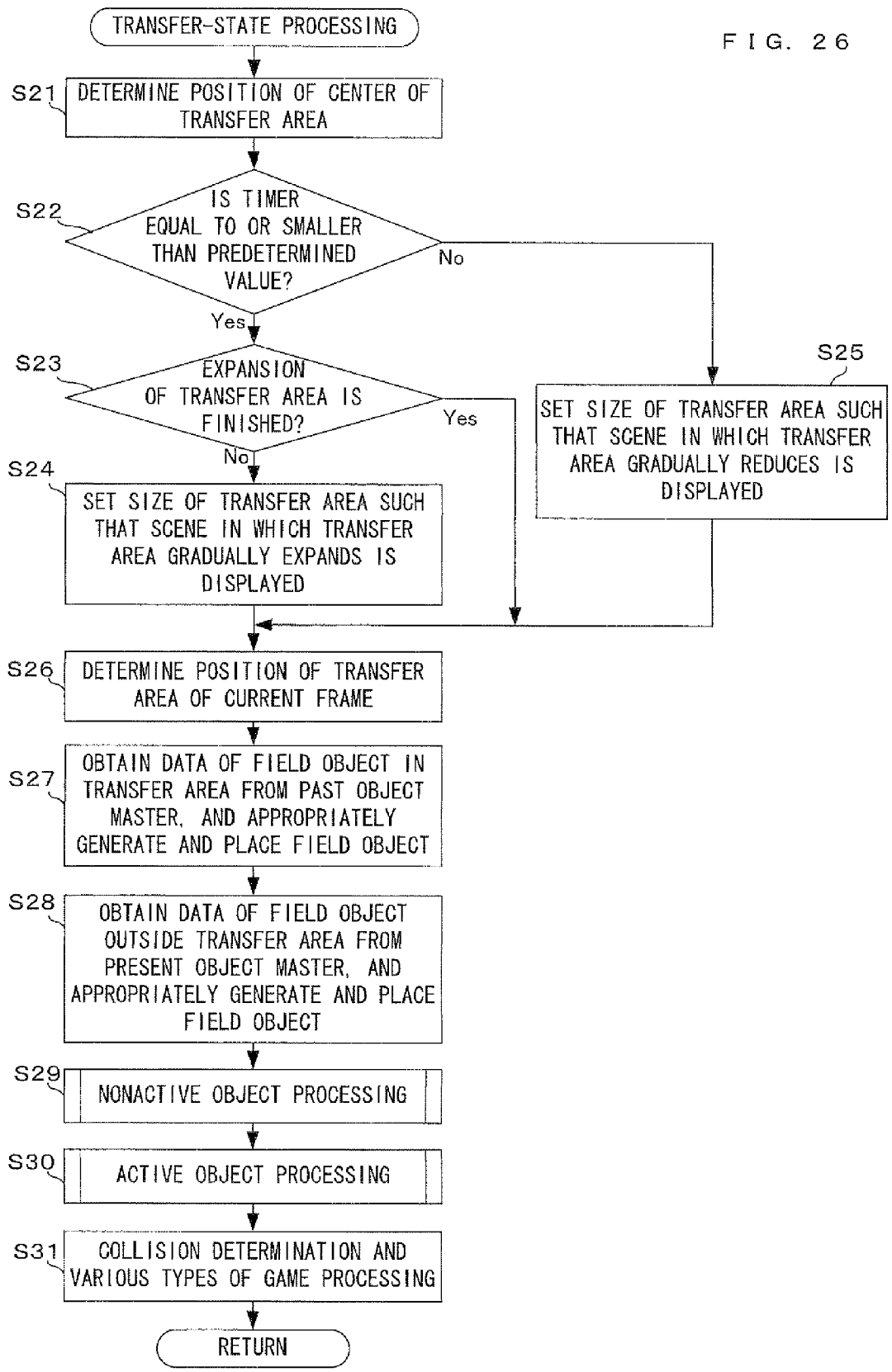
FIG. 26 is a flowchart showing a detail of transfer processing performed in step S9 in FIG. 25.

Next, processing performed when, in the above step S4, it is determined that the transfer flag 131 is on (YES in step S4), will be described. In this case, in step S9, transfer-state processing is executed. The transfer-state processing is processing performed when the "present world" and the "past world" are present at the same time (in the setting of the game, when the "past world" is transferred). FIG. 26 is a flowchart showing a detail of the transfer-state processing in the above step S9. Referring to FIG. 26, first, in step S21, a position of the center of the transfer area 221 is determined in the virtual game space.

Next, in step S22, with reference to the transfer timer 132, whether or not a count value indicated by the transfer timer 132 is equal to or smaller than a predetermined value is determined. In the present embodiment, the predetermined value is "20". As a result of the determination, if it is determined that the count value is equal to or smaller than the predetermined value (YES in step S22), next, in step S23, whether or not expansion of the transfer area 221 has been completed is determined. In the present embodiment, the transfer area 221 is displayed on the screen such that the transfer area 221 circularly expands around the crystal object 102 with 60 frames (1 second) being taken. Whether or not this expansion has been completed is determined in the step S23. As a result of the determination, if it is determined that the expansion of the transfer area 221 has been completed (YES in step S23), processing in step S26 described later is performed.

On the other hand, if it is determined that the expansion of the transfer area 221 has not been completed (NO in step S23), in step S24, the size (for example, radius) of the transfer area 221 is appropriately set such that a scene in which the transfer area 221 expands with 60 frames being taken as described above is displayed. Thereafter, processing in step S26 described later is performed.

On the other hand, as a result of the above step S22, if the count value indicated by the transfer timer 132 is not equal to or smaller than the predetermined value (NO in step S22), the time limit during which the "past world" appears has run out. Therefore, in step S25, the size (for example, radius) of the transfer area 221 is appropriately set such that a scene in which the transfer area 221 reduces with several frames being taken is displayed.

Next, in step S26, based on the position of the center of the transfer area 221 and the size of the transfer area 221 determined in the above steps, a position of the transfer area 221 in the current processing loop is determined, and data indicating the position is stored as the transfer area data 130.

Next, in step S27, with reference to the past object master 145, processing of setting a field object in the transfer area 221 is executed. Specifically, first, with reference to the object identification data 141, the object number 1411 of a field object positioned in the transfer area 221 is extracted. Next, based on the object number 1411, the past object master 145 is searched, and data of the corresponding field object is obtained. Then, based on the obtained data, the field object is generated and placed appropriately (replaces a field object forming the "present world"). Referring to FIG. 9 as an example, a field object representing a verdant ground is placed in the transfer area 221. Note that instead of generating a field object, only texture data of a field object may be changed to texture data indicated by the past object master 145 (that is, only a texture may be replaced).

Next, in step S28, with reference to the present object master 143, processing of setting a field object outside the transfer area 221 is executed. Also in this processing, as in the above step S27, the present object master 143 is searched based on the object number 1411 of a field object extracted from the object identification data 141. Then, data corresponding to the object number 1411 is obtained and placed appropriately (or only a texture may be replaced).

Note that the above processing in steps S27 and S28 may not be performed on all field objects. That is, the difference between a position of the transfer area 221 of the previous frame and a position of the transfer area 221 of the current frame may be calculated, and the processing may be performed on only a field object positioned in a portion corresponding to the difference.

Figure 27:
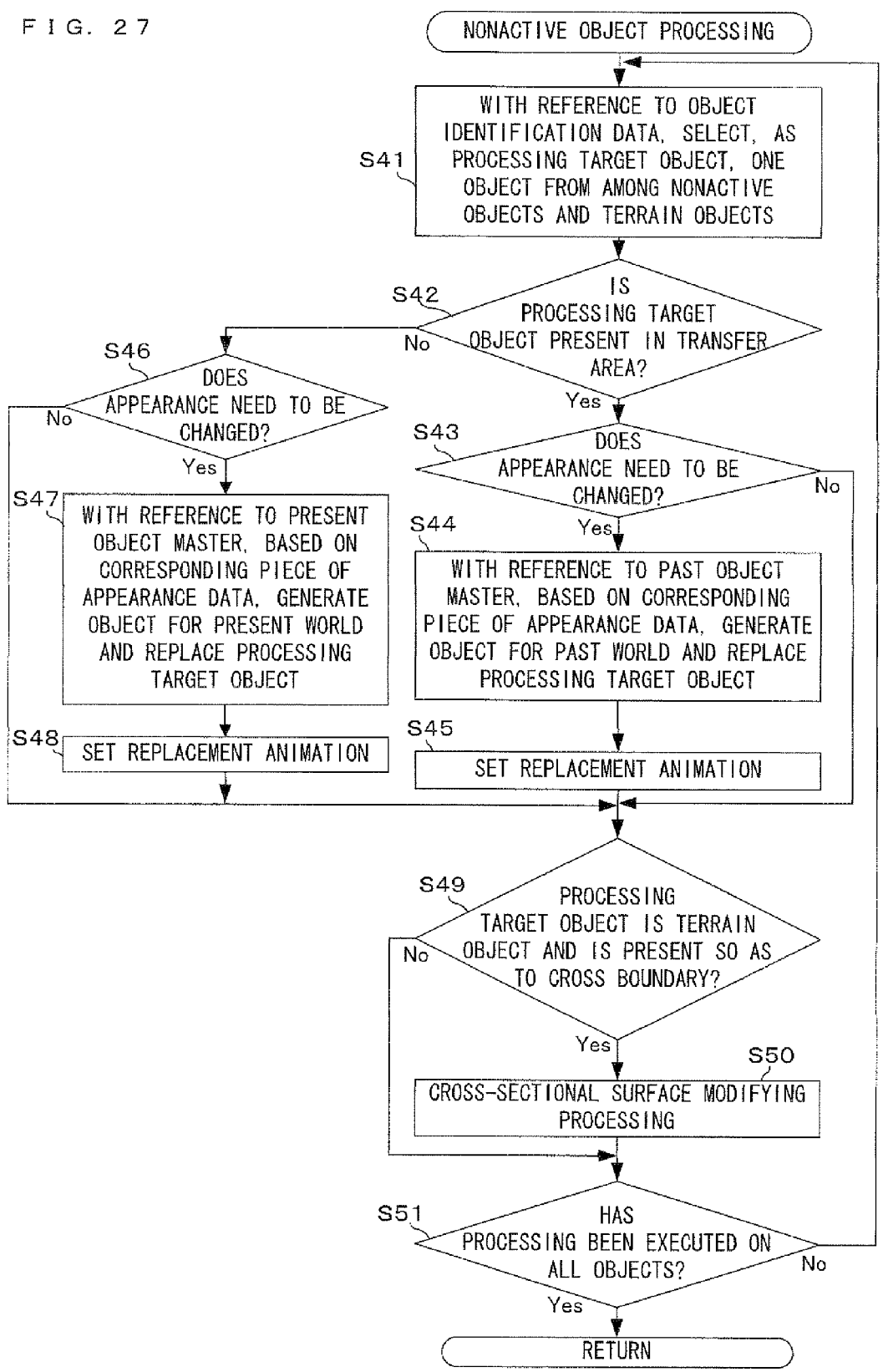
FIG. 27 is a flowchart showing a detail of nonactive object processing performed in step S29 in FIG. 26.

Next, in step S29, nonactive object processing is executed. This processing is processing of controlling a nonactive object such as a plant object, and a terrain object such as a rock or a construction. FIG. 27 is a flowchart showing the detail of the nonactive object processing performed in step S29. Referring to FIG. 27, first, in step S41, one object is selected as a processing target of processing described below, from among nonactive objects and terrain objects, with reference to the object identification data 141.

Next, in step S42, whether or not the object (hereinafter, referred to as a processing target object) selected in the above step S41 is present in the transfer area 221 is determined. The determination is performed by, for example, comparing the current position 1412 of the processing target object with a range of coordinates indicated by the transfer area data 130. In addition, other than this, the determination may be performed based on whether or not the current position 1412 of the processing target object is present within a predetermined distance from the crystal object 102. As a result of the determination, if it is determined that the processing target object is present in the transfer area 221 (YES in step S42), in step S43, whether or not the appearance of the processing target object needs to be changed is determined. That is, whether the processing target object was present in the "present world" or in the "past world" in the processing loop of the previous frame, is determined. If the processing target object was present in the "present world", the appearance of the processing target object needs to be changed, and if the processing target object was present in the "past world", the appearance of the processing target object does not need to be changed. This determination is performed by, for example, in the processing loop of the previous frame, storing information indicating whether or not the processing target object is present in the transfer area 221, in the external main memory 12, and then referring to the information in the processing loop of the current frame. As a result of the determination, if it is determined that the appearance of the processing target object does not need to be changed (NO in step S43), processing in step S49 described later is performed. On the other hand, if it is determined that the appearance of the processing target object needs to be changed (YES in step S43), in step S44, with reference to the past object master 145, a piece of the appearance data 1452 corresponding to the processing target object is obtained. Then, based on the piece of the appearance data 1452, an object for the "past world" is generated, and the corresponding object for the "present world" is replaced by the object for the "past world". At this time, in the present embodiment, an object is not changed instantaneously on the screen. Animation showing an object for the "present world" changing to an object for the "past world" is displayed. For example, in the case where a tree object which is not present in the "present world" is to be displayed, animation in which, first, a tree object having a small size is displayed, and then the tree object gradually enlarges with several frames being taken, is displayed. Processing of setting such "replacement animation" is executed in step S45. Thereafter, processing in step S49 described later is performed.

On the other hand, as a result of the determination in step S42, if it is determined that the processing target object is not present in the transfer area 221 (NO in step S42), in step S46, whether or not the appearance of the processing target object needs to be changed is determined. In this case, if the processing target object was in the "past world" in the processing loop of the previous frame, the appearance of the processing target object needs to be changed, and if the processing target object was present in the "present world", the appearance of the processing target object does not need to be changed. As a result of the determination, if it is determined that the appearance of the processing target object does not need to be changed (NO in step S46), processing in step S49 described later is performed. On the other hand, if it is determined that the appearance of the processing target object needs to be changed (YES in step S46), in step S47, with reference to the present object master 143, a piece of the appearance data 1432 corresponding to the processing target object is obtained. Then, based on the piece of the appearance data 1432, an object for the "present world" is generated, and the corresponding object for the "past world" is replaced by the object for the "present world". In addition, at this time, processing of setting "replacement animation" as described above is executed in step S48.

Figure 28:
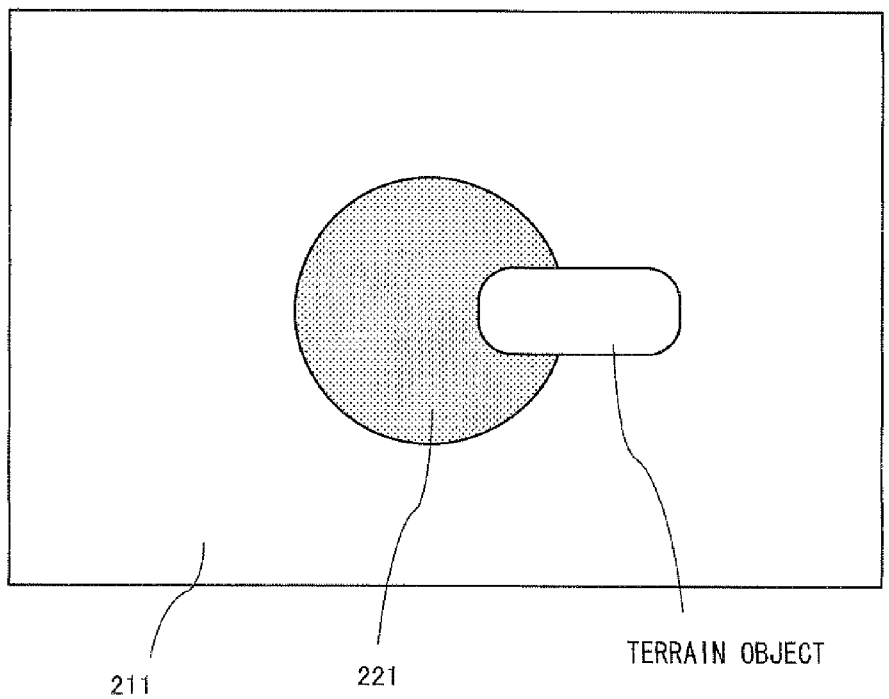
FIG. 28 is a diagram illustrating cross-sectional surface modifying processing.
Figure 29:
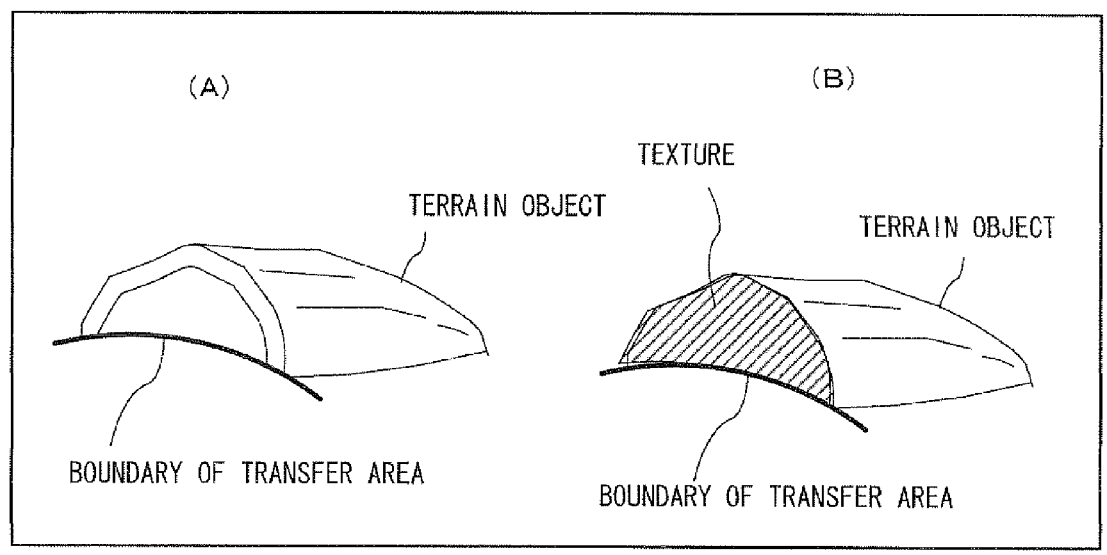
FIG. 29 is a diagram illustrating cross-sectional surface modifying processing.

Next, in step S49, whether or not a type of the processing target object is a terrain object and the processing target object is present so as to cross the boundary of the transfer area 221, is determined. For example, whether or not the processing target object is in a state shown in FIG. 28 is determined. As a result of the determination, if it is determined that the terrain object is present so as to cross the boundary of the transfer area 221 (YES in step S49), in step S50, cross-sectional surface modifying processing of modifying a cross-sectional surface of the terrain object along the boundary is executed. For example, if the terrain object is present in the "present world" but is not present in the "past world", a cross-sectional surface thereof can be exposed as shown in FIG. 29 (A). In such a case, as shown in FIG. 29 (B), processing of applying a predetermined texture to the cross-sectional surface such that the inside of the terrain object is invisible, is executed. On the other hand, if it is determined that the terrain object, which is the processing target object, is present so as not to cross the boundary of the transfer area 221 (NO in step S49), processing in the above step S50 is skipped.

Next, in step S51, whether or not the above-described processing has been executed on all nonactive objects and all terrain objects in the object identification data 141 is determined. As a result of the determination, if there is an object on which processing is yet to be executed (NO in step S51), processing in the above step S41 is executed again to select one of objects on which processing is yet to be executed, and subsequent steps of processing described above are executed. On the other hand, if it is determined that the above-described processing has been executed on all nonactive objects and all terrain objects in the object identification data 141 (YES in step S51), the nonactive object processing is ended.

Figure 30:
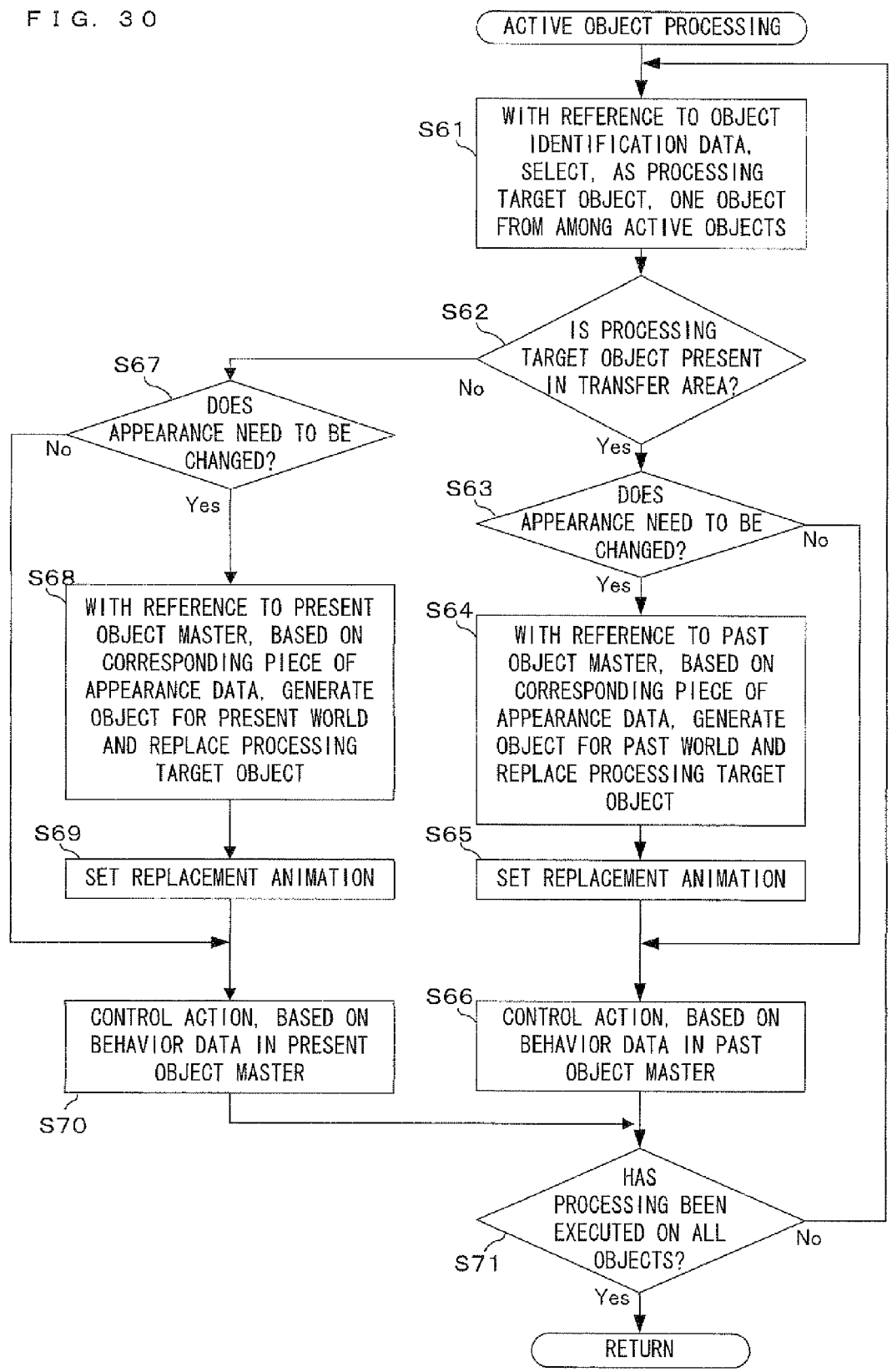
FIG. 30 is a flowchart showing a detail of active object processing performed in step S30 in FIG. 26.

Referring to FIG. 26 again, after processing in step S29 is finished, next, in step S30, active object processing is executed. The active object processing is processing of controlling the active object described above. FIG. 30 is a flowchart showing a detail of the active object processing executed in step S30. First, in step S61, with reference to the object identification data 141, one object is selected as a processing target object of processing described below, from among active objects.

Next, in step S62, whether or not the processing target object is present in the transfer area 221 is determined. As a result of the determination, if it is determined that the processing target object is present in the transfer area 221 (YES in step S62), in step S63, whether or not the appearance of the processing target object needs to be changed is determined. As a result of the determination, if it is determined that the appearance of the processing target object does not need to be changed (NO in step S63), processing in step S66 described later is performed. On the other hand, if it is determined that the appearance of the processing target object needs to be changed (YES in step S63), in step S64, with reference to the past object master 145, a piece of the appearance data 1452 corresponding to the processing target object is obtained. Then, based on the piece of the appearance data 1452, an object for the "past world" is generated, and the corresponding object for the "present world" is replaced by the object for the "past world". In addition, processing of setting "replacement animation" as described above is executed in step S65. For example, in the case where a "chicken" is changed to a "monster" as described with reference to FIG. 13 and FIG. 14, animation in which the "chicken" gradually reduces while rotating there, and then the "monster" gradually enlarges while rotating, is displayed.

Next, in step S66, with reference to the past object master 145, a piece of the behavior data 1453 corresponding to the object numbers 1411 of the processing target object is obtained. Based on the piece of the behavior data 1453, an action of the processing target object is controlled. Thereafter, processing in step S71 described later is performed.

On the other hand, as a result of the determination in step S62, if it is determined that the processing target object is not present in the transfer area 221 (NO in step S62), in step S67, whether or not the appearance of the processing target object needs to be changed is determined. As a result of the determination, if it is determined that the appearance of the processing target object does not need to be changed (NO in step S67), processing in step S70 described later is performed. On the other hand, if it is determined that the appearance of the processing target object needs to be changed (YES in step S67), in step S68, with reference to the present object master 143, a piece of the appearance data 1432 corresponding to the processing target object is obtained. Then, based on the piece of the appearance data 1432, an object for the "present world" is generated, and the corresponding object for the "past world" is replaced by the object for the "present world". In addition, at this time, processing of setting "replacement animation" as described above is executed in step S69.

Next, in step S70, with reference to the present object master 143, a piece of the behavior data 1433 corresponding to the object numbers 1411 of the processing target object is obtained. Based on the piece of the behavior data 1433, an action of the processing target object is controlled.

Next, in step S71, whether or not the above-described processing has been executed on all active objects in the object identification data 141 is determined. As a result of the determination, if there is an active object on which processing is yet to be executed (NO in step S71), processing in the above step S61 is executed again to select one of active objects on which processing is yet to be executed, and subsequent steps of processing described above are executed. On the other hand, if it is determined that the above-described processing has been executed on all active objects in the object identification data 141 (YES in step S71), the active object processing is ended.

Referring to FIG. 26 again, after processing in step S30 is finished, next, in step S31, collision determination and various types of game processing are executed. A content of processing in step S31 is similar to that in the above step S6. However, a content of collision determination with respect to collision of the player object 101 with a field object, and a content of game processing accompanying the collision determination vary depending on whether or not the player object 101 is present in the transfer area 221. That is, when the player object 101 is present in the transfer area 221, the past object master 145 is referred to, and when the player object 101 is not present in the transfer area 221, the present object master 143 is referred to. Then, a piece of the behavior data 1433 or 1453 corresponding to a field object that is in contact with the player object 101 is appropriately obtained, and game processing corresponding to a characteristic of a field of the "present world" or the "past world". This is the end of the transfer processing. After the transfer processing is finished, processing in step S7 described above is performed to display a game screen. This is the end of the detailed description of the game processing according to the present embodiment.

As described above, in the present embodiment, data (the present world data 142 and the past world data 144) defining two world states for one game space is prepared, and a state in which the two world states are present at the same time is displayed as a game screen. Thus, the player can progress a game while viewing the two world state. As a result, for example, it becomes possible to pass a place which the player has thought it impossible to pass, or an object which the player has thought is a peaceful animal rushes at the player object, whereby unexpectedness of development of the game increases, and further, amusingness of the game increases.

In addition, as described in the present embodiment, two world states are present at the same time in one game space, and the game space is shot by a virtual camera whereby a game screen is displayed. Therefore, the present invention has an advantage in that a processing load is reduced, in comparison with, for example, processing in which: two worlds as described above are created as separate game spaces, and are separately rendered or subjected to other processing; and the resultant images are finally combined.

Figure 31:
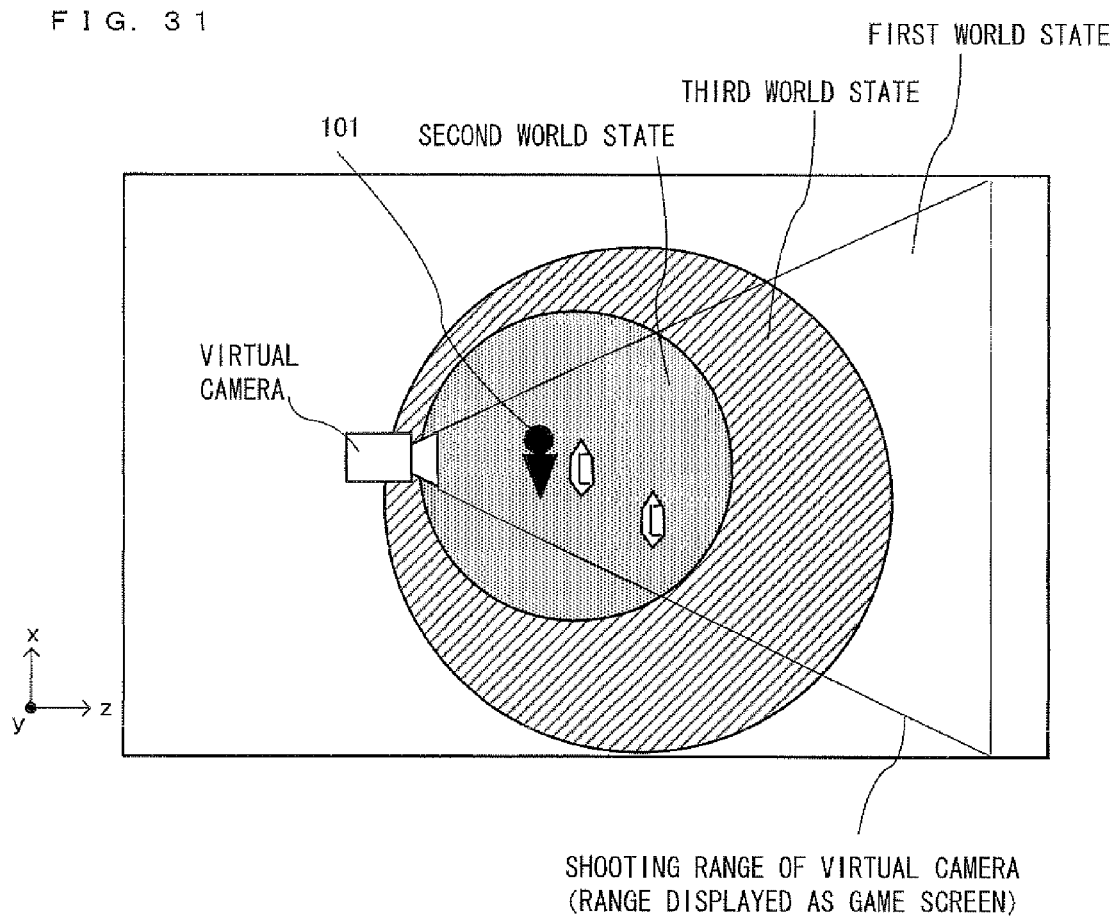
FIG. 31 is a diagram showing a case where three world states are displayed on one game screen.

Note that in the present embodiment, although two world states including a "present world" and a "past world" are used as an example of "world states", the number of world states is not limited to two, and three or more world states (for example, further including a "future world" or an "earlier past world") may be defined. In addition, three world states may be displayed on one game screen as in an example shown in FIG. 31.

In addition, two world states as described above may be defined for the entirety of the virtual game space, or may be defined only for a part of the virtual game space.

In addition, although in the present embodiment, the size of the transfer area 221 is determined in advance, the present invention may be configured such that the size of the transfer area 221 can be varied in accordance with an operation of the player.

In addition, for example, behaviors and states of the above active objects may be controlled as follows, instead of using the above described control method. First, "terrain codes" are individually assigned to the above field objects and the terrain objects (the allocated "terrain code" may be duplicated). Then, based on the "terrain code" corresponding to a place where the player object 101 or the active object is present, the behavior or the appearance of the player object 101 or the active object may be changed. For example, data in a table shown in FIG. 32 is defined for the field object and the terrain object. As shown in FIG. 32, object numbers 501 for identifying the field objects and the terrain objects correspond to the respective terrain codes 502. Moreover, data in a table shown in FIG. 33 is defined for the player object and an active object (if necessary, also a nonactive object). As shown in FIG. 33, plural combinations of terrain codes 512, appearance data 513, behavior data 514 correspond to each of objects (object numbers 511). Under the condition that such data is defined, the terrain code 502 corresponding to a place where the player object or an active object is present is obtained from the data in the table shown in FIG. 32. Next, pieces of the behavior data 514 and other data corresponding to the terrain code 502 are obtained from the data in the table shown in FIG. 33. Then, based on the obtained pieces of data, the player object 101 or the active object is controlled.

In addition, a two-dimensional image obtained by looking down upon the above virtual three-dimensional space may be displayed as a "map" screen in accordance with an operation of the player. Moreover, a map of the "past world" generated based on the past object master 145 may be displayed as a content of the "map". Then, a game may be progressed as follows. That is, the player may move the player object 101 in the "present world" while referring to the map of the "past world", and may generate the above transfer area 221 at a desired place. In this case, preferably, an object corresponding to the above-described crystal switch is set as an object which can be carried by the player 101.

In the present embodiment, a series of steps of processing for displaying two world states of the "present world" and the "past world" are executed by one apparatus (game apparatus 3). In other embodiments, a series of steps of processing may be executed by an information processing system including a plurality of information processing apparatuses. For example, in an information processing system including a terminal-side apparatus, and a server-side apparatus capable of communicating with the terminal-side apparatus via a network, a part of the series of steps of processing may be executed by the server-side apparatus. In addition, in an information processing system including a terminal-side apparatus, and a server-side apparatus capable of communicating with the terminal-side apparatus via a network, a primary part of the series of steps of processing may be executed by the server-side apparatus, and the other part of the series of steps of processing may be executed by the terminal-side apparatus. In addition, the above information processing system may include a plurality of information processing apparatuses on the server side, and the plurality of information processing apparatuses may share execution of processing to be executed on the server side.

While the invention has been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored therein a game program which is executed by a computer of a game apparatus executing a game of operating a player object in a game world created in a virtual space, the game program causing the computer to perform functionality comprising:
    setting a first area in the virtual space;
    setting a second area in the virtual space;
    generating a first object to be placed in the set first area, based on first configuration information for configuring a first state in at least a part of the game world;
    generating a second object to be placed in the set second area, based on second configuration information for configuring a second state different from the first state at a predetermined position in the virtual space to which the first configuration information is applied; and
    displaying at least a portion of a game world of the second state over a displayed game world of the first state in the virtual space.

2. The non-transitory computer-readable storage medium having stored therein the game program according to claim 1, wherein
    the game program further causes the computer to perform functionality comprising dynamically varying the first area in accordance with an operation of an operation device performed by a player.

3. The non-transitory computer-readable storage medium having stored therein the game program according to claim 2, wherein
    a position of the first area in the virtual space is dynamically varied in accordance with the operation of the operation device performed by the player.

4. The non-transitory computer-readable storage medium having stored therein the game program according to claim 1, wherein the game program further causes the computer to perform functionality comprising determining a reference position of the first area in accordance with an operation of an operation device performed by a player, and
setting the first area based on the reference position.

5. The non-transitory computer-readable storage medium having stored therein the game program according to claim 1, wherein
each of the first object and the second object is a field/terrain object for forming a field or terrain of the game world, and
the game program further causes the computer to perform functionality comprising generating a field or terrain of the game world on which a player object or a non-player object other than the terrain object can be placed based on the generated first field/terrain object and the generated second field/terrain object.

6. The non-transitory computer-readable storage medium having stored therein the game program according to claim 5, wherein
identification information is set for each of the first object and the second object, and
the game program further causes the computer to perform functionality comprising obtaining a piece of the identification information corresponding to the first object or the second object on which the player object or the non-player object is placed, and determining a behavior or a state of the player object or the non-player object, based on the obtained piece of the identification information.

7. The non-transitory computer-readable storage medium having stored therein the game program according to claim 5, wherein
the game program further causes the computer to perform functionality comprising controlling an action of the player object placed on the field or the terrain of the game world, in accordance with an operation of an operation device performed by a player.

8. The non-transitory computer-readable storage medium having stored therein the game program according to claim 5, wherein
an attribute is set for the non-player object, the attribute differing depending on whether the non-player object is placed in the first area or in the second area.

9. The non-transitory computer-readable storage medium having stored therein the game program according to claim 1, wherein
the game program further causes the computer to perform functionality comprising
generating a two-dimensional map representing the game world, based on the first configuration information; and
displaying the generated two-dimensional map.

10. The non-transitory computer-readable storage medium having stored therein the game program according to claim 1, wherein
upon start of execution of the game, the game is started in a state in which the second area is set in the game world, and
at least a part of the set second area begins setting as the first area in accordance with an operation of an operation device performed by a player.

11. The non-transitory computer-readable storage medium having stored therein the game program according to claim 1, wherein the first area begins setting when a setting starting object for starting setting the first area is placed at a predetermined place in the game world.

12. The non-transitory computer-readable storage medium having stored therein the game program according to claim 11, wherein
a position of the first area is set based on a position of the setting starting object.

13. The non-transitory computer-readable storage medium having stored therein the game program according to claim 11, wherein
the setting starting object can be moved via the player object whose action is controlled in accordance with an operation of an operation device performed by a player.

14. The non-transitory computer-readable storage medium having stored therein the game program according to claim 11, wherein
the first area begins setting when the player object performs a predetermined action for the setting starting object.

15. The non-transitory computer-readable storage medium having stored therein the game program according to claim 1, wherein
the game program further causes the computer to perform functionality comprising cancelling the setting of the first area when a predetermined time has elapsed after the first area is set.

16. The non-transitory computer-readable storage medium having stored therein the game program according to claim 1, wherein
the game program further causes the computer to perform functionality comprising generating and displaying a game screen that includes at least a part of a boundary between the first area and the second area when the first area is set.

17. The non-transitory computer-readable storage medium having stored therein the game program according to claim 1, wherein
the game program further causes the computer to perform functionality comprising:
obtaining a position in the virtual space of an object present in either one of the first area and the second area; and
determining whether the obtained position is in the first area or in the second area,
the first object is generated, based on the first configuration information, when the obtained position is in the first area, and
the second object is generated, based on the second configuration information, when the obtained position is in the second area.

18. A game system for executing a game of operating a player object in a game world created in a virtual space, the game system comprising:
a display device configured to display the game world; and
a game apparatus associated with the display device and having one or more processors configured to perform functionality comprising
a first area setting unit for setting a first area in the virtual space,
a second area setting unit for setting a second area in the virtual space,
a first object generation unit for generating a first object to be placed in the first area set by the first area setting unit, based on first configuration information for configuring a first state in at least a part of the game world,
a second object generation unit for generating a second object to be placed in the second area set by the second area setting unit, based on second configuration information for configuring a second state different from the first state at a predetermined position in the virtual space to which the first configuration information is applied, and a state displaying unit for displaying at least a portion of a game world of the second state over a displayed game world of the first state in the virtual space.

19. A game apparatus for executing a game of operating a player object in a game world created in a virtual space, the game apparatus comprising:

a first area setting unit for setting a first area in the virtual space;

a second area setting unit for setting a second area in the virtual space;

a first object generation unit for generating a first object to be placed in the first area set by the first area setting unit, based on first configuration information for configuring a first state in at least a part of the game world;

a second object generation unit for generating a second object to be placed in the second area set by the second area setting unit, based on second configuration information for configuring a second state different from the first state at a predetermined position in the virtual space to which the first configuration information is applied; and a state displaying unit for displaying at least a portion of a game world of the second state over a displayed game world of the first state in the virtual space.

20. A game control method performed by a game apparatus for executing a game of operating a player object in a game world crated in a virtual space, the game control method comprising:

setting a first area in the virtual space;

setting a second area in the virtual space;

generating a first object to be placed in the set first area, based on first configuration information for configuring a first state in at least a part of the game world;

generating a second object to be placed in the set second area, based on second configuration information for configuring a second state different from the first state at a predetermined position in the virtual space to which the first configuration information is applied; and displaying at least a portion of a game world of the second state over a displayed game world of the first state in the virtual space.

* * * * *